United States Patent [19]

Nogami et al.

[11] Patent Number: 5,708,933
[45] Date of Patent: Jan. 13, 1998

[54] DRIVE APPARATUS FOR IMAGE CARRIER OF IMAGE FORMING APPARATUS AND IMAGE FORMING APPARATUS

[75] Inventors: Yutaka Nogami; Shinichi Kanaya; Takahiko Ryuzaki, all of Ebina, Japan

[73] Assignee: Fuji Xerox Co., Ltd., Tokyo, Japan

[21] Appl. No.: 733,190

[22] Filed: Oct. 17, 1996

[30] Foreign Application Priority Data

Oct. 20, 1995 [JP] Japan .................................. 7-273120
Jun. 13, 1996 [JP] Japan .................................. 8-152630

[51] Int. Cl.$^6$ ...................................................... G03G 21/00
[52] U.S. Cl. ............................................. 399/167; 399/302
[58] Field of Search ............................... 399/167, 297, 399/302; 198/835; 474/148, 150, 273

[56] References Cited

U.S. PATENT DOCUMENTS 5,528,348  6/1996  Miwa et al. ............................... 399/167

FOREIGN PATENT DOCUMENTS

A-1-193888   8/1989   Japan .
A-1-282567   11/1989  Japan .
2-199464     8/1990   Japan .
A-4-75065    3/1992   Japan .
A-4-258967   9/1992   Japan .
A-6-264970   9/1994   Japan .

*Primary Examiner*—Nestor R. Ramirez
*Attorney, Agent, or Firm*—Oliff & Berridge, P.L.C.

[57] ABSTRACT

A drive apparatus is comprised of a driven shift of a rotary photosensitive drum, a drive motor and a gear mechanism for rotatably driving the driven shaft, and a flywheel rotated around a wheel rotary shaft, for stabilizing the rotations of the driven shaft. A pulley having a large diameter is mounted on a rotary shaft directly coupled to the driven shaft, whereas a pulley having a small diameter is mounted on the wheel rotary shaft. An endless belt is wound on these pulleys, so that drive force is transferred from the rotary shaft to the wheel rotary shaft, and an angular velocity of the flywheel is made higher than that of the driven shaft.

14 Claims, 21 Drawing Sheets

DRIVE APPARATUS FOR IMAGE CARRIER OF IMAGE FORMING APPARATUS AND IMAGE FORMING APPARATUS

BACKGROUND OF THE INVENTION

The present invention relates to an image forming apparatus and a drive apparatus for driving an image carrier such as a photosensitive drum of an image forming apparatus, e.g. a copying machine, a facsimile, and a printer.

In an image forming apparatus using the electrophotographic system, a surface of an image carrier such a photosensitive drum is uniformly charged by a charger, a latent image corresponding to an image to be formed is written into the charged surface by utilizing the photoelectric effect by laser light, and then toner is transported from a developer to this latent image so as to form a visual image. Then, this toner image is directly, or indirectly transferred onto an image forming object such as a paper and an OHP sheet.

A diameter of the above-mentioned laser light is, for instance, on the order of 60 μm (micrometers), and this laser light is scanned along a direction perpendicular to the travel direction of the image carrier, so that a latent image is formed. In this case, if the image carrier is traveled in a constant speed, then an interval between latent image writing lines becomes constant. However, when the travel speed of the image carrier becomes unstable due to, for example, vibrations, a condensation/rarefaction phenomenon will occur in the latent image writing lines. Then, this may cause density fluctuations in a toner image, resulting in deterioration of image qualities. Moreover, in a color image forming apparatus, a plurality of colored toner images are stacked to generate a desirable color. When density of the respective toner images is fluctuated, the resultant color image could not have the desirable color tone.

As the unstable mode of the rotation (revolution) number of the image carrier, there is a periodical vibration caused by an error in mounting precision of a rotation center shaft. More specifically, a color image forming apparatus may employ a movable developing device, a movable transfer device, and a movable cleaning blade. When these devices are in contact with/separated from the image carrier, the instantaneous acceleration/deceleration of the image carrier would be induced. Even when the speed variation of the sheet transport roller is propagated via the sheet for forming the image and/or the speed variation of the developing roller of the developing device mode in contact with the image carrier is propagated, vibrations are produced in the image carrier. Furthermore, in the case that the image carrier is driven by way of the gears, vibrations having short periods may be produced, which are caused by instantaneous variations in the rotation speeds of the gears by the gear backlash.

In general, to stabilize the speed of the image carrier, a flywheel is mounted on the rotary shaft of the image carrier so as to increase inertia moment. Also, according to the technique disclosed in the Unexamined Japanese Patent Application No. Hei. 1-193888, the weight of the flanges positioned at the edges of the photosensitive drum is increased, by which a similar effect to that of the flywheel can be achieved.

Furthermore, in recent year, such an idea has been proposed that the angular velocity of the flywheel is made higher than that of the image carrier in order to emphasize the speed stabilizing effect by the flywheel. This is because kinetic energy by inertia (will be referred to as "inertia energy" hereinafter) "E" may be expressed by the following formula:

$$E = J\omega^2/2,$$

where symbol "ω" indicates an angular velocity, and symbol "J" denotes inertia moment. Normally, since the inertia moment J is directly proportional to a squared value of a diameter, when a diameter of a flywheel is increased, the inertia energy E is also increased. However, this may cause the heavyweight, so that the supporting mechanism becomes bulky and expensive, and further, a large space capable of storing such a bulky flywheel is required. As a result, the image forming apparatus becomes bulky, and it is rather difficult to mount/replace the image carrier. Therefore, it is useful to employ such a measure that while the angular velocity "ω" is increased, the inertia energy E is directly proportional to a squared value of "ω".

As a consequence, the Unexamined Japanese Patent Application No. Hei. 4-75065 discloses that the friction roller having a small diameter is positioned in contact with the surface of the photosensitive drum, and then the flywheel is mounted on this friction roller in a coaxial relation. In this case, the flywheel is rotated by the friction roller having the small diameter, and at the same time, the angular velocity of the flywheel is made higher than that of the photosensitive drum.

However, when such a friction wheel type drive force transmission is carried out, a slip is produced between the friction roller and the photosensitive drum due to contamination and wearing of the photosensitive drum, so that the rotation stabilizing function by the flywheel would be deteriorated. Moreover, such a problem will occur shortly, due to environmental reasons (for instance, floating toner), in an image forming apparatus.

In accordance with the technique disclosed in the Unexamined Japanese Patent Application No. Hei. 1-282567, the cylindrical inertia member having the same function as that of the flywheel is provided inside the hollow photosensitive drum, and the drive force of the photosensitive drum is transferred to the flywheel by the planet (epicyclic) gear mechanism. At the same time, the angular velocity of the flywheel is made higher than that of the photosensitive drum. Also, the Unexamined Japanese Patent Application No. Hei. 4-258967 has proposed such an apparatus that the flywheel is arranged in a half way of the gear train of the drive system for the image carrier.

However, when the gear type drive force transmission is carried out between the flywheel and the image carrier involving the planet gear mechanism, descent/ascent of the rotation speed are repeated within a short time, because of presence of the gear backlash. Accordingly, although the employment of the flywheel is tried to stabilize the rotations, this aiming could not be sufficiently achieved, or may be impeded.

In the technique described in the Unexamined Japanese Patent Application No. Hei. 1-282567, the planet gear mechanism is provided within the photosensitive drum, which may increase the manufacturing cost of the components. Image carriers such as photosensitive drums need be normally replaced due to deterioration of surface photosensitive layers thereof. Every time the image carriers are replaced, the gear mechanisms are disposed, which never provide better conditions. Moreover, every time the photoconductive drum is replaced, a large number of gears for constituting the planet gear mechanism are replaced, resulting in cumbersome operation.

Furthermore, another technique has been proposed that a plurality of dynamic dampers are mounted on a rotary shaft of a photosensitive drum. The dynamic dampers are equipped with portions for constituting inertia dead weight, and viscous/elastic portions such as rubber. In addition to the inertia moment caused by the weight, vibrations are attenuated by the viscous/elastic portion. However, the frequency range capable of attenuating vibrations is limited by the dynamic damper. In accordance with the technique of the Unexamined Japanese Patent Application No. Hei. 6-264970, a plurality of dynamic dampers are employed in order to expand the vibration attenuatable frequency range. However, this technique would require the high manufacturing cost. Also, it is rather difficult to mount/replace the image carrier.

SUMMARY OF THE INVENTION

The present invention has been made in an attempt to solve the above-described problems, and has an object to provide a low-cost drive apparatus capable of firmly stabilizing a moving speed of an image carrier for a long time period, and also capable of easily replacing the image carrier, and to provide such an image forming apparatus with employment of this drive apparatus.

To solve the above-described problems, a drive apparatus, according to the present invention, for an image carrier of an image forming apparatus, is featured by comprising:

a first rotary shaft rotated to thereby move an image carrier;

drive means for driving/rotating the first rotary shaft;

a flywheel rotated around a second rotary shaft as a center to thereby stabilize the rotations of the first rotary shaft;

a first pulley interlocked by the first rotary shaft;

a second pulley having a diameter smaller than, or equal to that of the first pulley and mounted on the second rotary shaft; and friction type wrapping transfer means wound on these pulleys, wherein the drive force from the first rotary shaft to the second rotary shaft, and an angular velocity of the flywheel is set to be higher than, or equal to that of the first rotary shaft.

In this structure, firstly, since the flywheel is mounted on the second rotary shaft different from the first rotary shaft, the flywheel may be provided at the position separated from the first rotary shaft. Then, when the image carrier is replaced, the interlock mechanism between the first rotary shaft and the first pulley is released, but a large number of gears need not be replaced. Depending upon the use conditions, the friction type wrapping transfer means might be released from the pulley. Also, in this case, the mounting/releasing works can become very easy.

The Inventors of the present invention could find out such a fact that since the friction type wrapping transfer means equal to the elastic member is wound on the first pulley and the second pulley, the drive apparatus owns a free degree of approximately 2, as viewed by that this drive apparatus is regarded as the vibration system. Although the vibration system having a free degree of approximately 2 is similar to such a case that the dynamic damper is mounted on the drive apparatus, the vibration attenuating frequency range by the drive apparatus according to the present invention can be made wider than that achieved by employing the dynamic damper. As a result, the vibrations can be more effectively attenuated.

The drive force is transferred from the first rotary shaft to the second rotary shaft by way of the first and second pulleys, and the friction type wrapping transfer means (for example, endless belt). As a result, comparing with such a transfer mechanism, for instance, a gear transfer mechanism; a geared belt and a geared pulley; and a chain and a sprocket (chain wheel), there is no risk that vibrations happen to occur, e.g. vibrations occurred during gear meshing operation, and occurred between backlashes of gears, and thus the angular velocity of the first rotary shaft, eventually, the peripheral speed of the image carrier can be firmly stabilized.

Furthermore, there is a certain possibility that the friction type wrapping transfer means such as the pulley and the endless belt may produce slips due to wearing and contamination problems when this transfer means is employed so as to transfer the large drive force. However, since the large drive force can be transferred, as compared with the friction wheel type drive force transfer means, even when the friction coefficiency is lowered, this friction type wrapping transfer means can endure such a long-term use.

Also, the pulley and the friction type wrapping transfer means do not push up the manufacturing cost.

It is preferable that the diameter of the second pulley is smaller than that of the first pulley; and the angular velocity of the flywheel is set to higher than that of the first rotary shaft.

In this case, since the angular velocity of the flywheel is made higher than that of the first rotary shaft, even when the size of the flywheel is small, the inertia energy can be increased, and also it is possible to suppress the unstable rotation number of the image carrier due to external disturbance.

Also, it is preferable that the first and second pulleys are mainly made from resin; a surface layer of the endless belt is made of rubber; and the diameter of the second pulley is larger than $\frac{1}{8}$ of the diameter of the first pulley. This implies that the contact area between the outer peripheral surface of the second pulley and the endless belt is made large, whereby slips occurred between them can be prevented. Preferably, the diameter of the second pulley is larger than, or equal to $\frac{1}{7}$ of the diameter of the first pulley.

In the above-described arrangement, it is preferable that the first rotary shaft is interlocked via a meshing type transfer mechanism by the drive means; and assuming that a peripheral speed of the image carrier is selected to be P mm/s among a rotation frequency of the drive means, and a frequency of a vibration produced from the meshing operation of the meshing type transfer mechanism, a frequency of a vibration which is most close to at least P Hz is located within a frequency range where the vibration is attenuated by the drive apparatus. As a result, it is possible to surely attenuate the vibrations of the frequencies under which the image defects readily and visibly recognized are introduced. Usually, a gear transfer mechanism is conceivable as the meshing type transfer mechanism. Alternatively, such a transfer mechanism as a geared belt and a geared pulley, and a chain and a sprocket may be conceived.

In this case, the drive apparatus is a vibration system having a free degree of substantially 2, so that the drive apparatus essentially owns two natural frequencies; there are frequency ranges near the natural frequencies where the respective vibrations are amplified; there is one frequency range between the two frequency ranges where these vibrations are amplified, in which the vibrations are attenuated; and both the rotation frequency of the drive means and the frequency of the vibration produced by the meshing operation of the meshing type transfer mechanism are located in such a frequency range where this vibration is attenuated.

Alternatively, the drive apparatus is a vibration system having a free degree of substantially two, so that the drive apparatus essentially owns two natural frequencies; there are frequency ranges near the natural frequencies where the respective vibrations are amplified; there is a first frequency range between the two frequency ranges where these vibrations are amplified, in which the vibration is attenuated; there is a second frequency range where the vibrations are attenuated at a frequency higher than a frequency range where the higher vibration is amplified; and the rotation frequency of the drive means is located in the first frequency range where the vibration is attenuated, whereas the frequency of the vibration produced from the meshing operation of the meshing type transfer mechanism is located in the second frequency range where the vibration is attenuated.

In such a case that an intermediate transfer member is provided with the image forming apparatus, which is moved while being supported by the rotary shaft and to which an image formed on a surface of the image carrier is transferred, a rotary shaft of the intermediate transfer member is interlocked to the second rotary shaft.

Also, in such a case that a preceding image carrier is provided with the image forming apparatus, which is moved while being supported by the rotary shaft, which has a surface on which an image has been formed, and which transfers the image to a surface of the image carrier, a rotary shaft of the preceding image carrier is interlocked to the second rotary shaft.

In these cases, not only the move speed of the image carrier can be stabilized by employing a single flywheel, but also the move speed of either the intermediate transfer member or the preceding image carrier can be stabilized, resulting in a high efficiency.

Further, an image forming apparatus, according to the present invention, is preferably comprised of:

a first rotary shaft rotated to thereby move an image carrier;

drive means for driving/rotating the first rotary shaft;

a flywheel rotated around a second rotary shaft as a center to thereby stabilize the rotations of the first rotary shaft;

a first pulley interlocked by the first rotary shaft;

a second pulley having a diameter smaller than, or equal to that of the first pulley and mounted on the second rotary shaft; and friction type wrapping transfer means wound on these pulleys; wherein:

the drive force from the first rotary shaft to the second rotary shaft, and an angular velocity of the flywheel is set to be higher than, or equal to that of the first rotary shaft.

In this image forming apparatus the image forming apparatus is comprised of a cover; and sheet transport means for transporting a sheet along the cover in a vertical direction; and the image carrier is arranged near the cover in such a manner that an image is formed on the sheet transported by the sheet transporting means in a half way.

DETAILED DESCRIPTION OF THE PREFERRED EMBODIMENTS

Referring now to drawings, a description will be made of embodiment modes of the present invention.

(First Embodiment)

A. Structure of Embodiment

Figure 1:
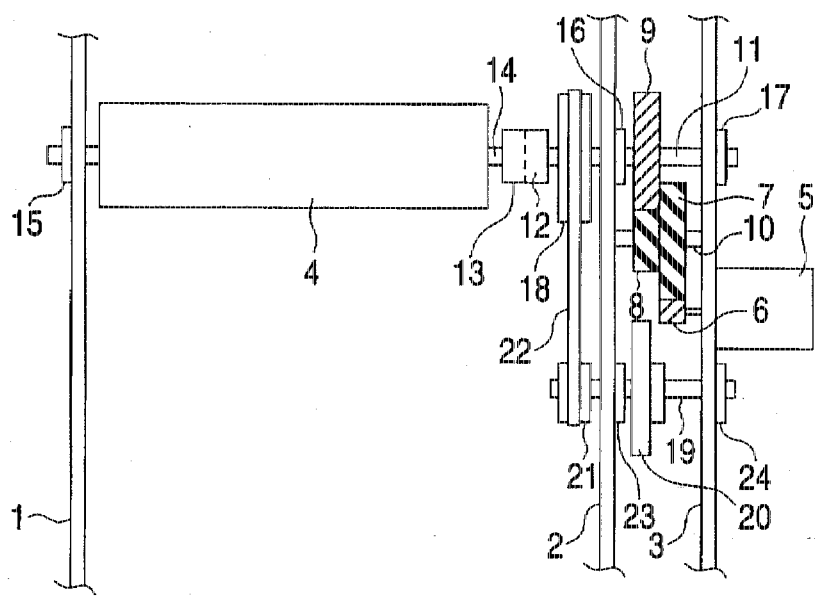
FIG. 1 is a plan view for indicating a drive apparatus of an image carrier of an image forming apparatus according to the First Embodiment of the present invention.

First, FIG. 1 is a plan view for representing the First Embodiment mode of the present invention. In this drawing, reference numerals 1 to 3 indicate frames of an image forming apparatus. The frames 1 to 3 are arranged in parallel to each other. A cylindrical photosensitive drum (image carrier) 4 is arranged between the frames 1 and 2. Various sorts of means for forming an image on a surface of the photosensitive drum 4 and for transferring this image to a sheet are arranged around the photosensitive drum 4. It should be noted that these means are omitted in FIG. 1.

On one hand, a drive motor (drive means) 5 for driving the photosensitive drum 4 is fixed on the frame 3. As this drive motor 5, either a servo motor or a stopper motor is preferably used. A small gear 6 is fixed on a rotary shaft of the drive motor 5, and this small gear 6 is meshed with a large gear 7. The large gear 7 is fixed to a rotary shaft 10 rotatably supported by the frames 2 and 3 together with the small gear 8. Then, the small gear 6 is meshed with the large gear 9. The large gear 9 is fixed on another rotary shaft 11 rotatably supported by the frames 2 and 3, and a shaft coupling 12 is fixed on an edge portion of the rotary shaft 11.

On the other hand, another shaft coupling 13 is fixed on an edge portion of a driven shaft (first rotary shaft) for constituting a rotary center of the photosensitive drum 4, and this shaft coupling 13 is mounted on the shaft coupling 12. In this way, when the drive motor 5 is driven to be rotated, the rotation (revolution) speed thereof is reduced by the gears 6 to 9, so that while the reduced rotation speed is transferred, the rotary shaft 11 is rotated, and the driven shaft 14 is also rotated by the shaft couplings 12 and 13. It should be noted that although the rotary shaft 11 may be rotated by the drive motor 5 via a geared belt/a geared pulley and a chain/a sprocket, this rotary shaft 11 is preferably rotated by the gears 6 to 9 in view of such a point that a specific vibration may be easily specified, assuming that the drive apparatus of the embodiment corresponds to a vibration system. This is because when a belt and a chain is used, rigidity (stiffness) of the vibration system may be varied, depending upon tension given to the belt and the chain.

A pulley (first pulley) 18 is further fixed on the rotary shaft 11. It should be understood that reference numerals 15, 16, 17 represent bearings for rotatably supporting the driven shaft 14 and the rotary shaft 11 by the frames 1 to 3.

At a position separated from the above-described structural elements, a wheel rotary shaft (second rotary shaft) 19 is supported between the frames 2 and 3. A flywheel 20 is fixed on this wheel rotary shaft 19 in order to stabilize the rotation speed of the photosensitive drum 4. Furthermore, a pulley (second pulley) 21 is fixed on an edge portion of the wheel rotary shaft 19. A diameter of the pulley 21 is made smaller than, or equal to that of the pulley 18. In addition, the diameter of the pulley 21 is preferably made smaller than that of the above-described pulley 18.

Then, an endless belt (friction type wrapping transfer means) 22 is wound around the wheel rotary shaft 19 and the pulley 18. It should be noted that reference numerals 23 and 24 represent bearings for rotatably supporting the wheel rotary shaft 19 by the frames 2 and 3.

As the endless belt 22, such a belt is preferably made from a material having a high friction coefficient for a surface layer thereof, and from stainless steel, glass fiber, and carbon fiber for a core material which is slightly extended even when drive force is applied. In this case, a flat belt is used as the endless belt 22. A detailed explanation will be made of the material for the endless belt 22.

The pulleys 18 and 21 are made from a metal or a resin. Preferably, in order to increase the friction coefficients, the peripheral surfaces of these pulleys are treated in coarse condition, or a material having a higher friction coefficient such as urethane elastomer is formed on these peripheral surfaces as a thin layer.

It should be noted in this case that although the flat-belt-shaped endless belt 22 is utilized as the friction type wrapping transfer means to transfer the drive force between the pulleys 18 and 21, a V-belt may be employed as this friction type wrapping transfer means. Alternatively, instead of the endless belt, it is possible to use a loop-shaped rope, or cable. Such a modification may be similarly supplied to other Embodiments (will be discussed later).

Figure 2:
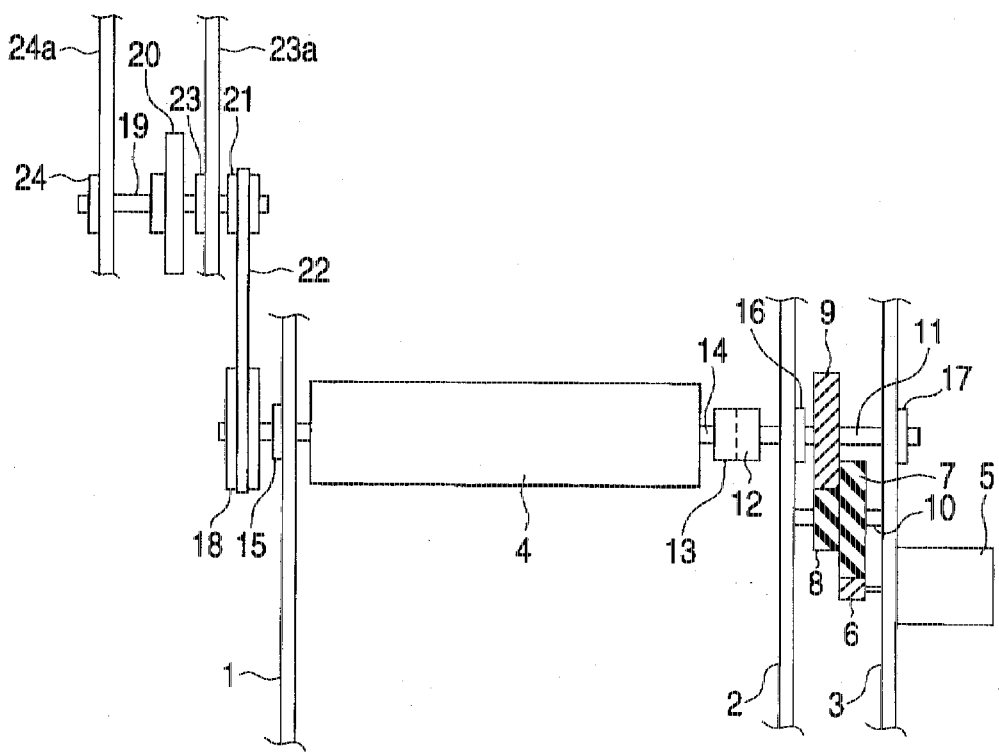
FIG. 2 is a plan view for showing a modification example of the First Embodiment.

FIG. 2 represents a modification example of the above-described embodiment. In this example, the flywheel 20 is positioned opposite to the gears 6 to 9, while sandwiching the photosensitive drum 4. Then, the pulley 8 is directly mounted on the driven shaft 14. Reference numerals 23a and 24a represent frames on which the bearings 23 and 24 for supporting the wheel pivoting shaft 19 are mounted.

B. Operations of Embodiment

As described above, when the drive motor 5 is driven to be rotated, the rotation speed is reduced by the gears 6 to 9, and then the rotary shaft 11 is rotated while the reduced rotation speed is transferred. As a result, the pulley 18 is also rotated which is fixed on the rotary shaft 11. At the same time, the driven shaft 14 is also rotated by the shaft couplings 12 and 13, so that the photosensitive drum 4 is rotated.

Also, the drive force of the pulley 18 is transferred to the pulley 21 by means of the endless belt 22 and thus the pulley 21 is rotated. As a result, the flywheel 20 positioned on the pulley 21 in the coaxial manner is rotated.

In this case, it is assumed that a radius of the pulley 18 is "$R_1$" and a radius of the pulley 21 is "$R_2$". $R_2$ is made smaller than $R_1$. As a consequence, the angular velocities of the flywheel rotary shaft 19 and the flywheel 20 are made higher than those of the rotary shaft 11, the driven shaft 14, and the photosensitive drum 4. Assuming that the angular velocity of the photosensitive drum 4 is "$\omega_1$", and the angular velocity of the flywheel is "$\omega_2$", then $$\omega_2 = \omega_1 R_1/R_2$$

The inertia energy "E" of the flywheel 20 may be expressed by the following formula:

$$E = J\omega_2^2/2 = J(\omega_1 R_1/R_2)^2/2$$

It should be noted that symbol "J" indicates inertia moment of the flywheel 20.

Next, assuming the flywheel 20 is mounted on the rotary shaft 11, not on the flywheel rotary shaft 19, the inertia energy "$E_i$" under this state is expressed by the following formula:

$$E_i = J\omega_1^2/2$$

Accordingly, in accordance with this embodiment, when the flywheel 20 is mounted, the inertia energy thereof can be made $(R_1 R_2)^2$ times greater than that of such a case that the flywheel 20 is mounted on the rotary shaft 11. As apparent from the foregoing description the speed increasing ratio $R_1/R_2$ is larger than 1. If this speed increasing ratio becomes, for instance, three times, then the inertia energy becomes nine times.

The inertia moment J of the flywheel 20 is expressed by Formula 1. It should be noted that symbol "dM" denotes weight of a very small portion.

$$J = \int_0^{R_2} r^2 dM \quad \text{[Formula 1]}$$

According to Formula 1, even when the flywheel 20 is directly mounted on the rotary shaft 11, not on the flywheel rotary shaft 19, if the radius $R_2$ of the flywheel 20 is increased, then the inertia energy thereof becomes large which is substantially proportional to the squared value thereof. In this case, if the radius $R_2$ becomes three times, then the inertia energy becomes nine times.

However, in such a case, the weight of the flywheel is increased, so that the supporting mechanism becomes bulky and expensive. Furthermore, a space capable of storing the flywheel having such a large radius is required. As a result, the entire apparatus becomes bulky.

To the contrary, according to this embodiment, when the inertia energy is increased by increasing the angular velocity, the flywheel 20 may have a small radius and also light weight, so that the bearings 16 and 17 may be made simply and compact, and further, rigidity of the frames 2 and 3 need not be increased. Also, the space capable of storing the flywheel 20 may be made small, which never causes the apparatus to become bulky.

In this case, the drive force transmission from the rotary shaft 11 to the flywheel rotary shaft 19 is carried out by using the friction force, i.e., the pulleys 18, 21 and the endless belt 22. As a result, comparing with such a transfer mechanism, for instance, a gear transfer mechanism; a geared belt and a geared pulley; and a chain and a sprocket (chain wheel), there is no risk that vibrations happen to occur, e.g. vibrations occurred during gear meshing operation, and occurred between backlashes of gears, and thus the angular velocity of the first rotary shaft, eventually, the peripheral speed of the photosensitive drum 4 can be firmly stabilized.

Furthermore, there is a certain possibility that the pulley and the endless belt may produce slips due to wearing and contamination problems when this transfer means is employed so as to transfer the large drive force. However, since the large drive force can be transferred, as compared with the friction wheel type drive force transfer means, even when the friction coefficiency is lowered, this friction type wrapping transfer means can endure such a long-term use.

In other words, assuming in the friction wheel type transfer means that the contact pressure is "P" and the friction coefficient is "$\mu$" the transfer force F is given as follows:

$$F = \mu P$$

Accordingly, when the friction coefficient is lowered, the resultant transfer force F is lowered in proportion to lowering of this friction coefficient. However, in accordance with the endless belt type transfer means, assuming that tension of the belt is "T", the friction coefficient between the belt and the pulley is "$\mu$", and the wrapping angle of the belt with respect to the pulley is "$\theta$", the resultant transfer force "F" is given as follows:

$$F = Te^{\mu\theta}$$

According to this formula, although the transfer force "F" is reduced in an exponential manner due to reductions in the friction coefficient "$\mu$", this transfer force "F" is increased in an exponential manner due to increases in the wrapping angle "θ". Therefore, when the wrapping angle "θ" of the belt for the pulley is previously set to be large value in order not to lower the transfer force if the friction coefficient is reduced, the friction type wrapping transfer means can endure such a long-term use. As described above, in accordance with this embodiment, performance of the apparatus can become stable with respect to the wearing and contamination problems.

Also, the pulleys and the endless belt 22 do not largely push up the manufacturing cost.

In addition, according to this embodiment, both the driven shaft 14 of the photosensitive drum 4 and the rotary shaft 11 are coupled with each other by the shaft couplings 12 and 13. In such a case that the photosensitive drum 4 is replaced due to deterioration of the photosensitive layer of the surface of the photosensitive drum 4, the couplings made up by the shaft couplings 12 and 13 may be released. A large number of gears need not be replaced. In this case, neither the pulleys 18 and 21, nor the endless belt 22 is required to be replaced.

It should be understood that when the endless belt 22 is released from the pulleys 18 and 21, independent from the photosensitive drum 4, due to the wearing and contamination reasons, the mounting/removing works thereof can be extremely made easy by releasing the couplings established by the shaft couplings 12 and 13.

It should be noted that in FIG. 1, the pulley 18 is positioned near the photosensitive drum 4 closer than the large gear 9. In FIG. 2, the pulley 18 is separated from the large gear 9 far from the photosensitive drum 4. To the contrary, when the pulley 18 is separated from the photosensitive drum 4 far from the large gear 9, even when the rotation number of the pulley 18 can be stabilized by the flywheel 20, vibrations caused by the rotations of the large gear 9 and the photosensitive drum 4 can no larger suppressed due to twist motion of the rotary shaft 11. However, when such an arrangement as shown in FIG. 1 or FIG. 2 is employed, the rotation stabilizing function of the flywheel 20 is not impaired.

As described above, in accordance with this embodiment, vibrations of the photosensitive drum 4 may be suppressed by utilizing the inertia energy of the flywheel 20, and the vibration suppression of the photosensitive drum 4 by the inertia energy can be made effective to externally applied disturbance. However, there are other many factors as to generations as well as attenuations of vibrations. In particular, regarding the drive apparatus of the photosensitive drum 4 as a vibration system, a specific attention should be paid to such a fact that the drive apparatus itself will amplify and attenuate vibrations. A description will now be made of such a specific point that vibrations may be effectively attenuated.

Figure 3:
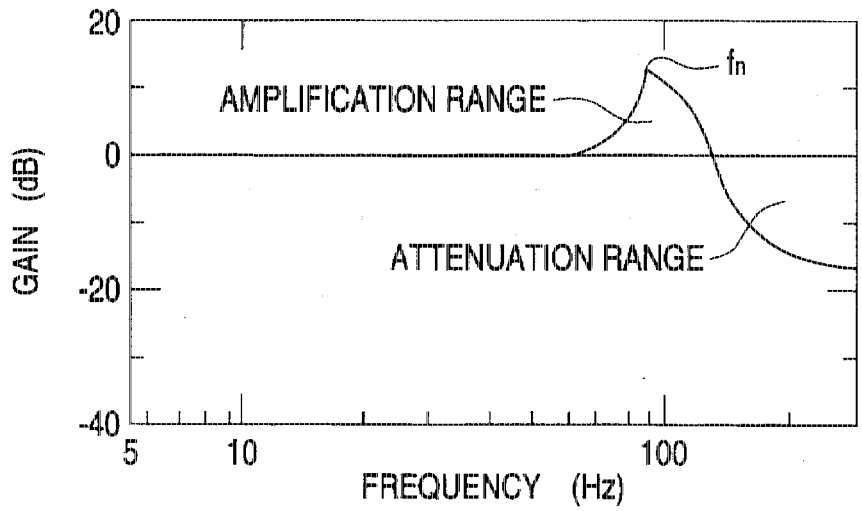
FIG. 3 is a graph for representing a vibration amplification/attenuation characteristic for the respective frequencies when the image carrier is driven by the motor via the gear without performing the vibration attenuation measure.
Figure 4:
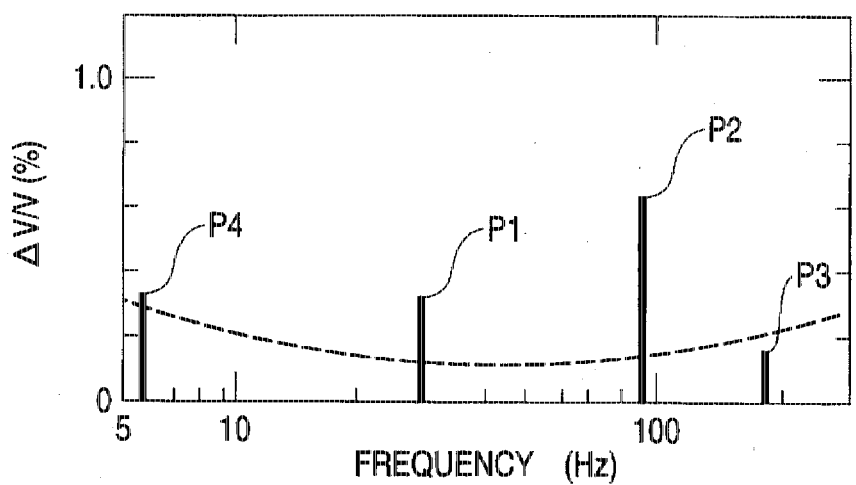
FIG. 4 is a graph for showing a speed variation spectrum of the image carrier analyzed by the Fast Fourier transform under the same condition as FIG. 3.

First, FIG. 3 and FIG. 4 indicate vibration test results obtained in such a case that while no specific care is taken to the vibration attenuating measure, the photosensitive drum 4 is driven via the gears 6 to 9 by the motor 5. In FIG. 3, there are shown gains of vibrations of the photosensitive drum 4 as a vibration amplification/attenuation characteristic, which is caused by vibrations in the respective frequencies. FIG. 4 indicates a velocity variation spectrum of the photosensitive drum 4, which is analyzed by using the Fast Fourier transform. It should be noted that symbol "V" represents a mean (average) peripheral speed of the photosensitive drum, and symbol "ΔV" denotes a shift in the peripheral speed.

A natural frequency "$f_n$" of the overall system of this drive apparatus may be expressed by Formula 2 in this case:

$$f_n = (1/2\pi)\sqrt{k_1/J_1} \qquad \text{[Formula 2]}$$

wherein symbol "$k_1$" indicates a spring constant of the system determined by rigidity of the gears 6 to 9, and symbol "$J_1$" represents inertia moment of the system mainly determined by the photosensitive drum 4.

As indicated in FIG. 3, amplifications of vibrations are induced near the natural frequency "$f_n$".

Also, as indicated by symbols P1 to P4 in FIG. 4, several vibration peaks are produced in this drive apparatus system. The peak P1 is caused by the rotations of the motor 5, and is coincident with the rotation number of the motor 5. The peaks P2 and P3 are produced by meshing the gears with each other. The peak P4 is caused by the rotations of the intermediate gears 7 and 8. Although not shown in the drawing, a peak caused by the rotations of the photosensitive drum 4 appears at a frequency lower than the frequency range shown in FIG. 4.

Figure 5:
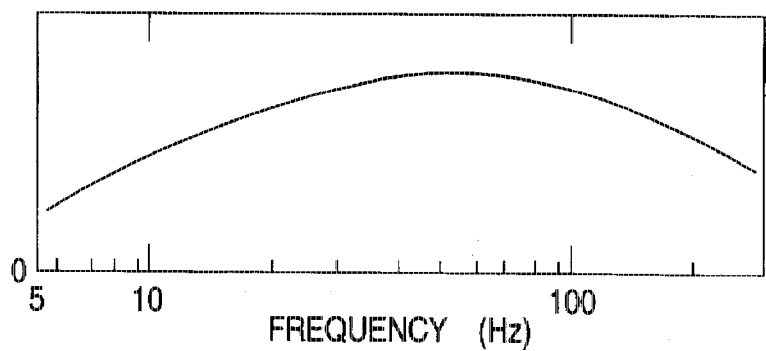
FIG. 5 is a graph for schematically showing how an image shift can be visually recognized in the normal image carrier.

FIG. 5 is a graphic representation for schematically showing how an image shift (deviation) can be visually recognized in such a normal photosensitive drum whose diameter is about several tens (mm) and whose peripheral speed is about several hundreds (mm/sec). Generally speaking, when a frequency is very high, a shift in an image appearing on sheet becomes small, which can be hardly recognized. Conversely, also when the frequency is very low, since a shift in the image will appear as expansion/compression of the entire image along the sheet travel direction, this image shift can be hardly recognized.

Then, when an image shift happens to occur in a frequency range indicated in FIG. 4, this image shift may be most apparently recognized by the user in his visual manner. According to a rule of thumb, when image shifts are produced every interval of 1 mm on the finally formed image, this may become most apparent as a defect. In other words, assuming that the peripheral speed of the photosensitive drum 4 is set to P mm/s, a vibration having a frequency of P Hz may readily induce the image shift which can be visually recognized most apparently. In correspondence with FIG. 5, when a target value capable of suppressing a vibration level ΔV/V is plotted in FIG. 4, a plotted trace appears as a dotted line.

As apparent from FIG. 3 and FIG. 4, the vibrations of such a frequency range, which should be suppressed in a high degree, could not be sufficiently attenuated in this drive apparatus system which has not employed any vibration attenuation measure. It should be noted that although the vibration level at the peak P3 is attenuated, this is merely caused by such a fact that the peak P3 is accidentally entered into the vibration attenuation range shown in FIG. 3.

Figure 6:
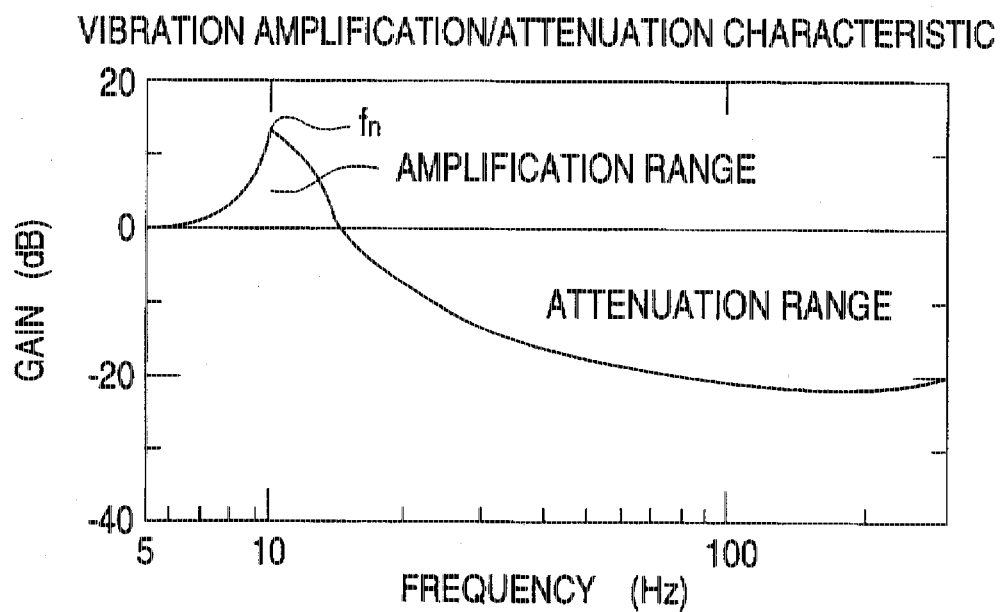
FIG. 6 is a graph for representing a vibration amplification/attenuation characteristic for the respective frequencies when the flywheel is mounted on the rotary shaft of the image carrier.
Figure 7:
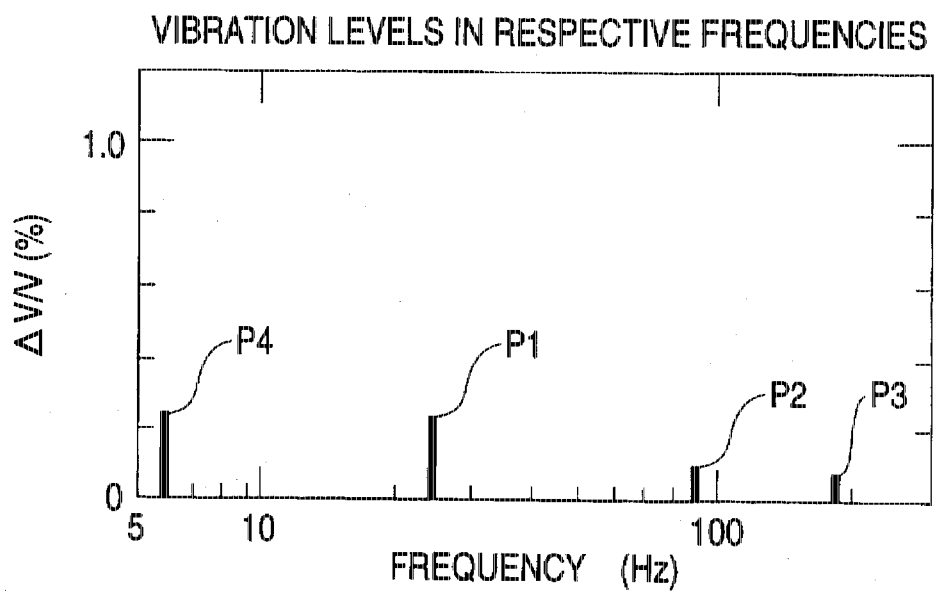
FIG. 7 is a graph for indicating a speed variation spectrum of an image carrier analyzed by the Fast Fourier transform under the same condition as FIG. 6.

Next, FIG. 6 and FIG. 7 indicate vibration test results obtained when the flywheel is directly mounted on the driven shaft 14 of the photosensitive drum 14.

In this case, the natural frequency "$f_n$" of the entire system of the drive apparatus is expressed by Formula 3 as follows:

$$f_n = (1/2\pi)\sqrt{k_1/(J_1 + J_2)} \qquad \text{[Formula 3]}$$

where symbol "$J_2$" is inertia moment of the flywheel.

As obvious from this formula, since the inertia moment $J_2$ is applied, the natural number $f_n$ is transited to such a frequency lower than that of FIG. 3 (see FIG. 6), and thus the attenuation range is similarly transited to such a low frequency range.

As a result, as seen from FIG. 7, the vibration levels at the peaks P1 to P3 are lowered. Also apparent from Formula 3, the larger the inertia moment $J_2$ is increased, the lower the natural frequency $f_n$ can be lowered. Thus, it is possible to attenuate the vibrations over the wide range. However, this may cause the dimension of the flywheel to be increased. The disadvantages of this case have already been explained.

Figure 8:
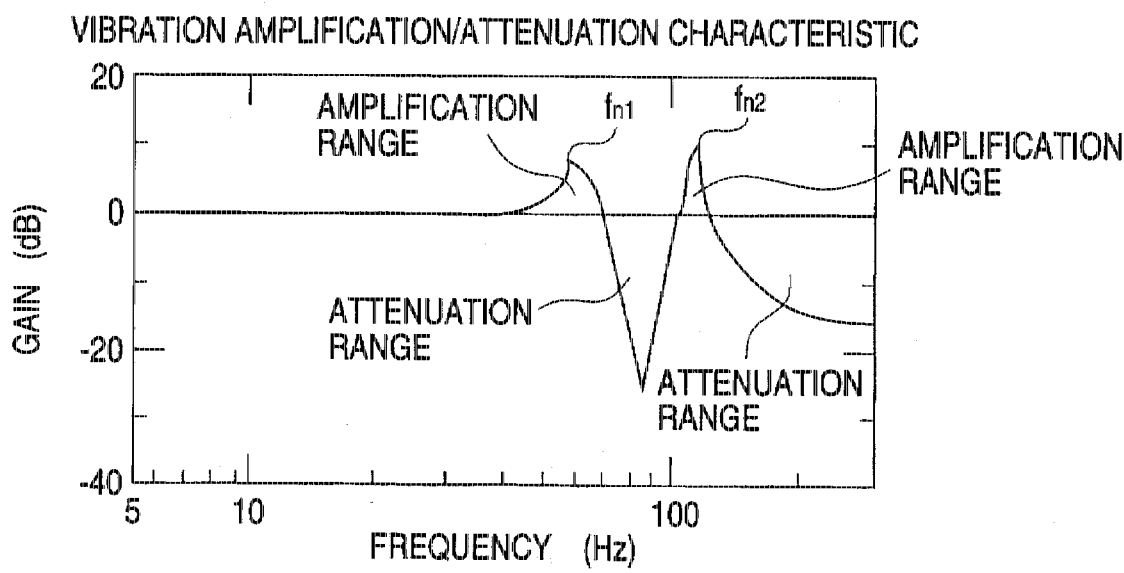
FIG. 8 is a graph for representing a vibration amplification/attenuation characteristic for the respective frequencies when the dynamic damper is mounted on the rotary shaft of the image carrier.
Figure 9:
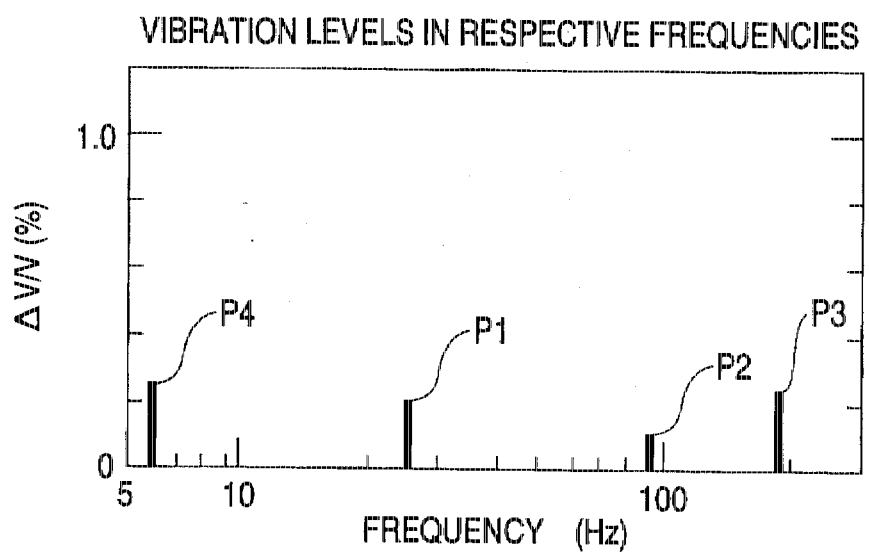
FIG. 9 is a graph for indicating a speed variation spectrum of an image carrier analyzed by the Fast Fourier transform under the same condition as FIG. 8.

FIG. 8 and FIG. 9 indicate vibration test results obtained when the above described dynamic damper is directly mounted on the driven shaft of the photosensitive drum 4.

The natural frequency "$f_n$" of the overall system of the drive apparatus in this case is expressed by Formula 4 from the generic formula about vibrations in a system having a free degree of 2:

$$f_n = \sqrt{(1/8\pi^2)[\{(k_1+k_2)/J_1+k_2/J_2\} \pm \sqrt{\{(k_1+k_2)/J_1+k_2/J_2\}^2 - 4(k_1k_2)/(J_1J_2)]}} \qquad \text{[Formula 4]}$$

wherein symbol "$J_2$" indicates inertia moment of the dynamic damper, and symbol "$k_2$" denotes a spring constant of the dynamic damper determined by rigidity of this dynamic damper.

As apparent from FIG. 8, two sets of vibration amplification regions, and two sets of natural frequencies "$f_{n1}$" and "$f_{n2}$" are produced in the system of this drive apparatus. This is caused by symbol of "±" contained in Formula 4. Although the vibration attenuation range appears between the two amplification ranges, the attenuation range thereof is extremely narrow. Also, although the vibration attenuation range appears even in the higher frequency than the higher amplification range, originally, there is no specific problem about the image shift with respect to this range. Accordingly, even in this drive apparatus with employment of only the dynamic damper, the sufficient vibration attenuation effect cannot be expected.

Figure 10:
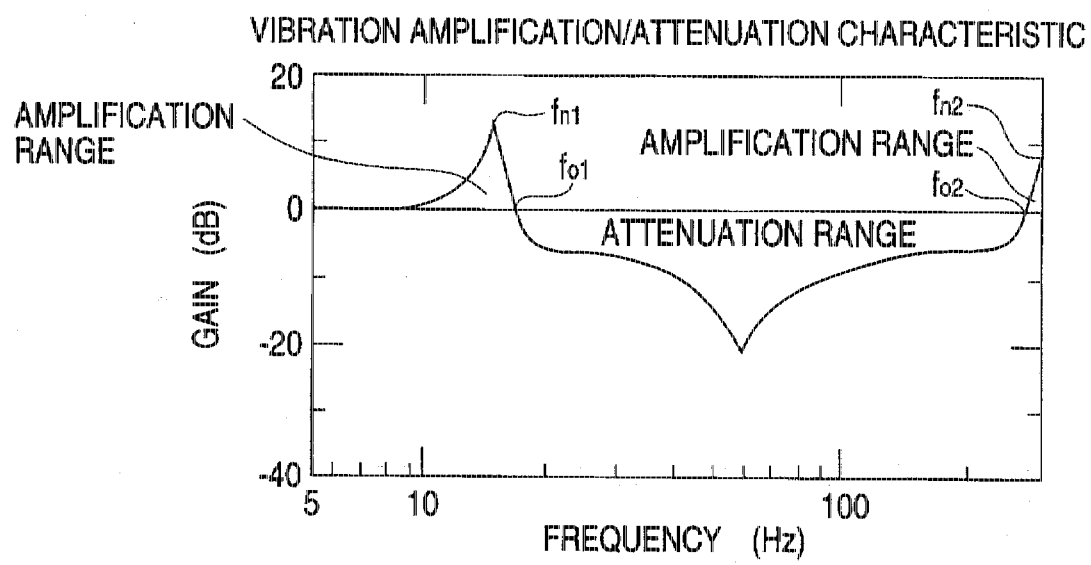
FIG. 10 is a graph for showing a vibration amplification/attenuation characteristic for the respective frequencies in case of the First Embodiment according to the present invention.
Figure 11:
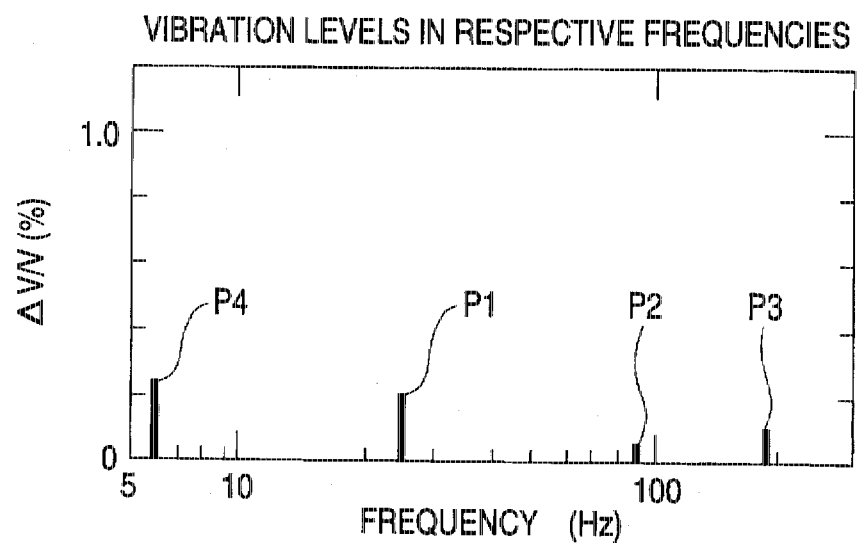
FIG. 11 is a graph for indicating a speed variation spectrum of an image carrier analyzed by the Fast Fourier transform under the same condition as FIG. 10.
Figure 12:
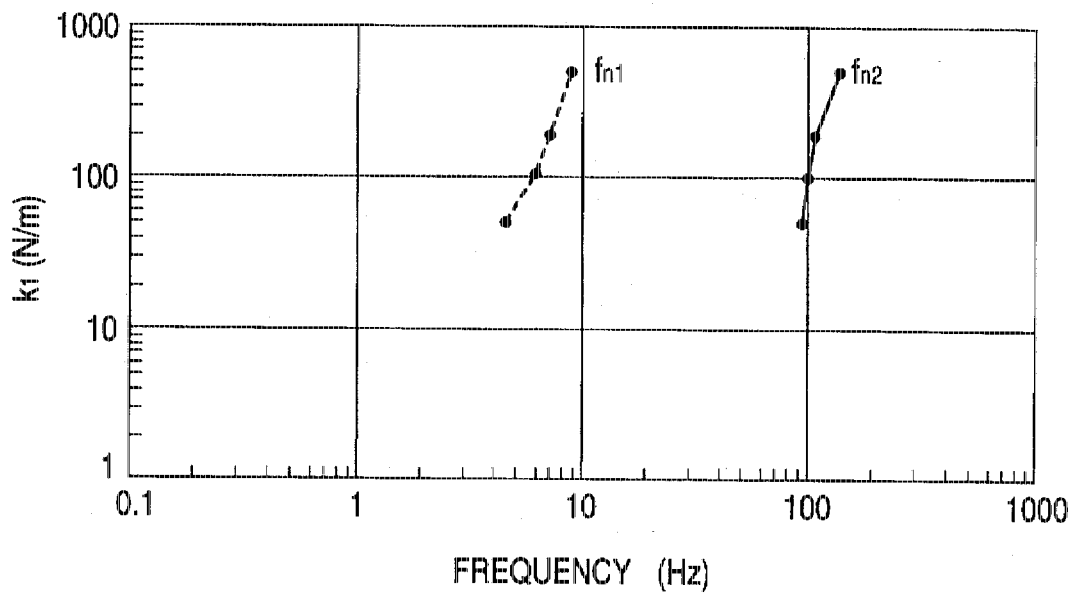
FIG. 12 is a graph for showing a relationship between one of the variables of the vibration theoretical formula in the First Embodiment of the present invention, and a natural frequency conducted from this vibration theoretical formula.
Figure 13:
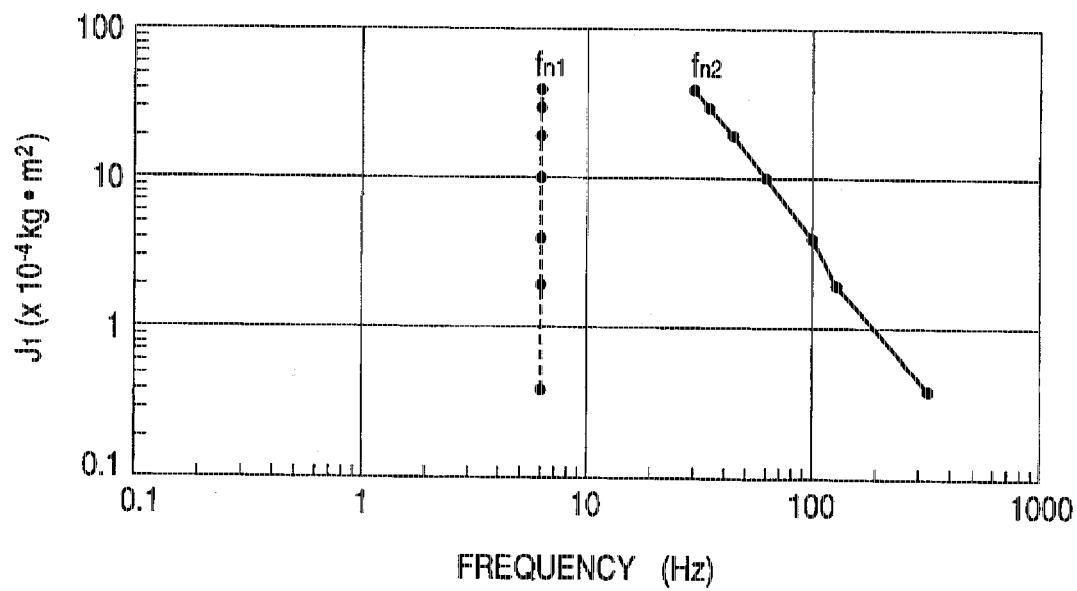
FIG. 13 is a graph for indicating a relationship between another variable of this vibration theoretical formula, and a natural frequency conducted from this formula.
Figure 14:
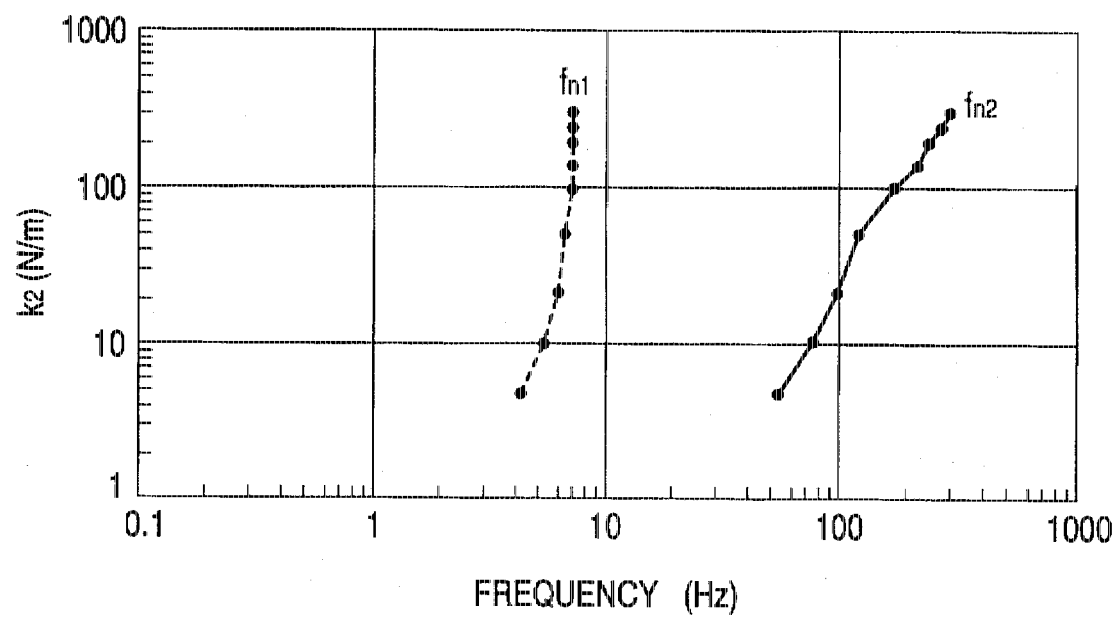
FIG. 14 is a graph for showing a relationship between a further variable of the vibration theoretical formula, and a natural frequency conducted from this formula.
Figure 15:
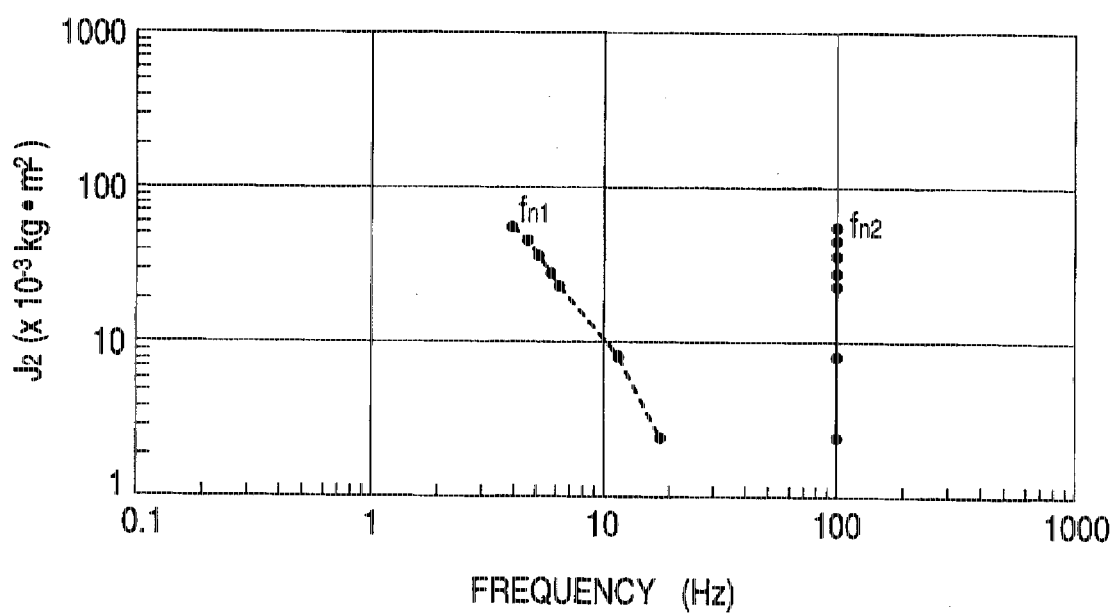
FIG. 15 is a graph for showing a relationship between a further variable of the vibration theoretical formula, and a natural frequency conducted from this formula.

Subsequently, FIG. 10 and FIG. 11 represent vibration test results of the drive apparatus indicated in FIG. 1 and FIG. 2. In this case, the natural frequency "$f_n$" of the entire system of this drive apparatus is also expressed by Formula 4. This is because the endless belt 22 equal to the elastic member is wound around the pulleys 18 and 21, so that a vibration portion approximated to the dynamic damper is newly produced, and then the drive apparatus according to the present invention may be a vibration system having a free degree of 2.

It should be noted in the drive apparatus according to the present invention that symbol "$k_2$" contained in Formula 4 indicates a spring constant of the vibration system constituted by the endless belt 22, the pulleys 18 and 21, and the flywheel 20, and symbol "$J_2$" denotes inertia moment of this vibration system. Symbol "$J_2$" is given by the following formula:

$$J_2 = J(R_1/R_2)^2,$$

wherein symbol "J" is inertia moment of the flywheel 20, symbol "$R_1$" represents a radius of the pulley 18, and symbol "$R_2$" indicates a radius of the pulley 21.

As represented in FIG. 10, even in the system of this drive apparatus, two sets of natural frequencies "$f_{n1}$" and "$f_{n2}$", and two sets of vibration amplification ranges are produced. However, in accordance with the present invention, since the speed increasing ratio $R_1/R_2$ is increased, the inertia moment $J_2$ of Formula 4 can be increased. As a consequence, the natural frequency $f_{n1}$ can be lowered. When the spring constant $k_2$ is increased, the natural frequency $f_{no}$ can be increased. In other words, the attenuation range shown in FIG. 10 can be widened. Then, if all of the produced vibration frequencies could be located within this attenuation range, then it is conceivable that the vibration attenuation can be firmly carried out. In the actual use, if the vibrations can be attenuated in such a manner that a shift in an image may be visually recognized, then the sufficient effects can be achieved. Accordingly, a very low frequency, for example, a frequency around 1 Hz need not be located in this attenuation region (see FIG. 5).

When the amplification range is not coincident with the frequency of the produced vibration, there is no problem in actual use. Although not shown in FIG. 10, since another attenuation range is produced in the frequency higher than, or equal to the higher amplification range, the frequency produced by meshing the gears may be entered into this attenuation range. The frequency produced by meshing these gears may be varied by setting the number of gear teeth.

Subsequently, a description will now be made how to adjust two sets of these natural frequencies $f_{n1}$ and $f_{n2}$. First, FIG. 12 to FIG. 15 are graphic representations for indicating results obtained in such a manner that the variables $k_1$, $J_1$, $k_2$, $J_2$ contained in Formula 4 are varied, respectively, to thereby actually measure the natural frequencies $f_{n1}$ and $f_{n2}$. As apparent from these drawings, when $k_1$ is increased, only $f_{n1}$ is slightly increased. When $f_{n2}$ is considerably increased and then $J_1$ becomes large, $f_{n1}$ is not substantially changed. However, $f_{n2}$ becomes a small value. When $k_2$ becomes large, only $f_{n1}$ is slightly increased. When $f_{n2}$ is considerably increased and then $J_2$ becomes large, $f_{n1}$ becomes small and there is substantially no charge in $f_{n2}$. This result may correspond to the calculation values of Formula 4.

Figure 16:
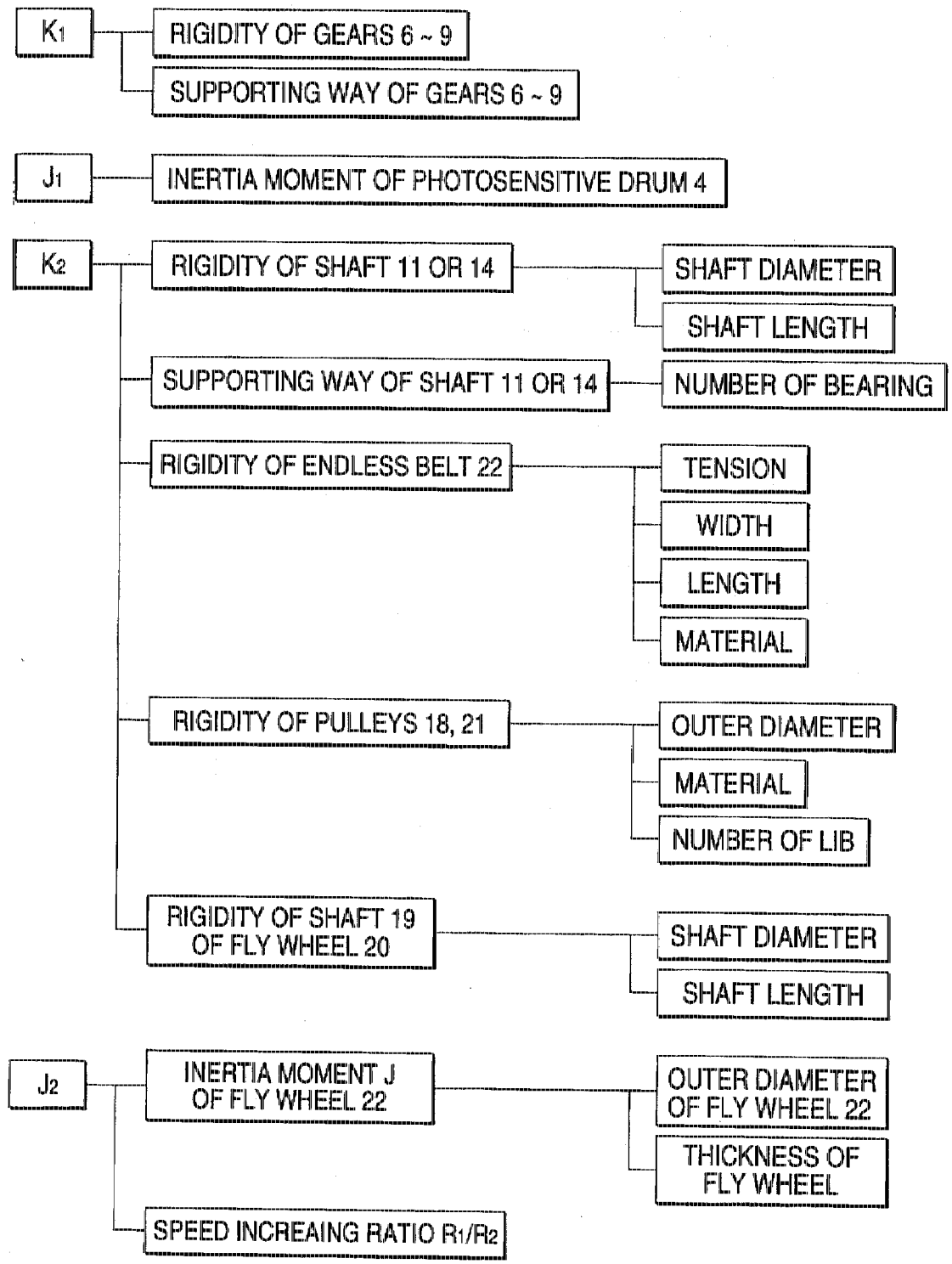
FIG. 16 is an illustration for indicating factors of variables of the vibration theoretical formula.

FIG. 16 indicates various factors which may give influences the variables $k_1$, $J_1$, $k_2$, $J_2$ of Formula 4. It should be understood that both the spring constant $k_1$ and the inertia moment $J_1$ are theoretically variable, but cannot be practically charged. In other words, as to the spring constant $k_1$, the gears necessarily require the rigidity to some extent for the sake of drive force transfer, and the supporting way is limited. Even when a lightening hole is formed in the gear, the rigidity could not be charged only by approximately 10%. As to the inertia moment $J_1$, when the processing speed of the image forming apparatus and the torque of the motor 5 under use are present, the diameter and the weight of the photosensitive drum 4 can be hardly varied.

To the contrary, there are many variable factors in the spring constant $k_2$ and the inertia moment $J_2$. As a result, if the spring constant $k_2$ is made large to thereby increase the frequency $f_{n2}$ and also the inertia moment $J_2$ is made large to thereby decrease the frequency $f_{n1}$, then the attenuation range may be extended. It should be noted that when the inertia moment J of the flywheel 22 among the factors of the inertia moment is made large, the weight of the flywheel 22 would be increased, resulting in an undesirable solution. Accordingly, the speed increasing ratio $R_1/R_2$ is preferably increased. Then, experimental results obtained with respect to these factors will be explained with reference to drawings.

Figure 17:
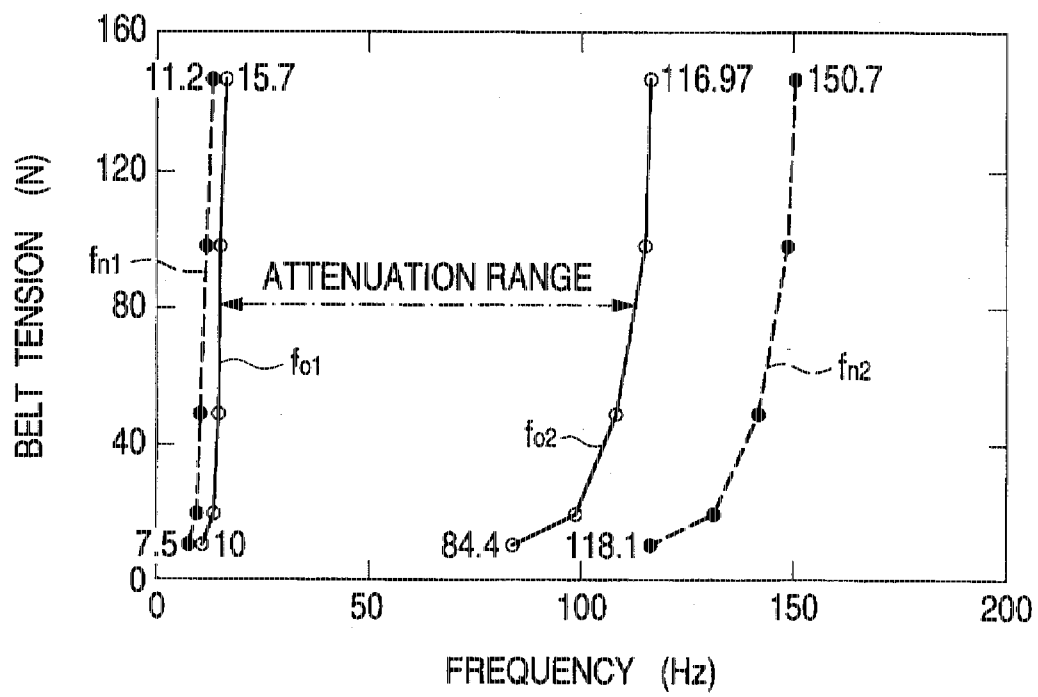
FIG. 17 is a graph for indicating an experimental result obtained by investigating differences such as natural frequencies when tension of an endless belt is varied in the First Embodiment.
Figure 18:
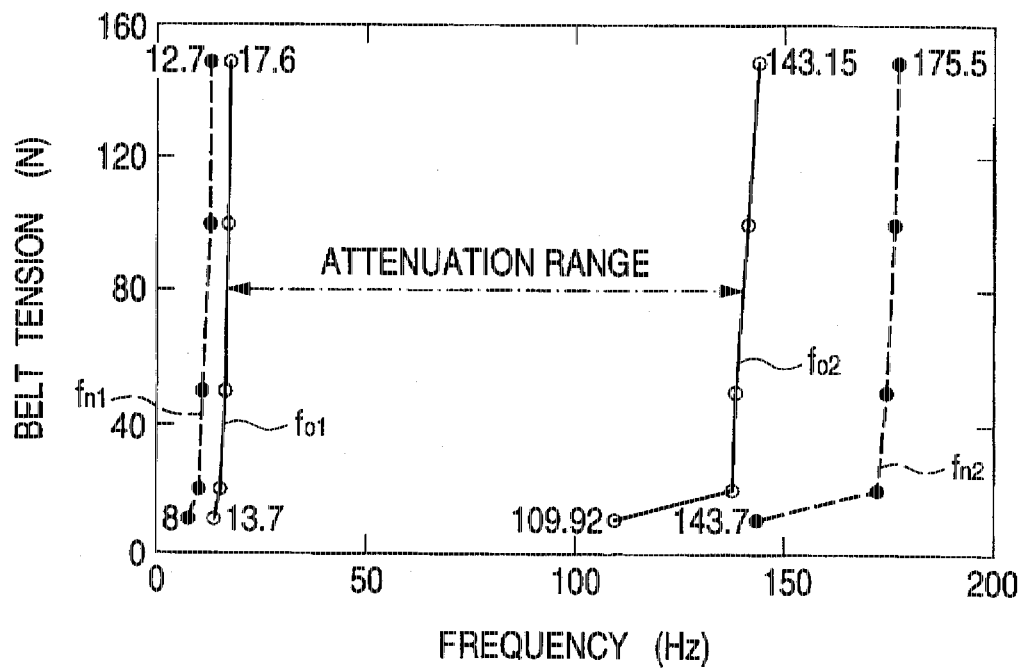
FIG. 18 is a graph for indicating another experimental result obtained by investigating differences such as natural frequencies when tension of an endless belt is varied in the First Embodiment.

FIGS. 17 and 18 indicate experimental results for investigating the vibration attenuation characteristic, while tension of the endless belt 22 wound on the pulleys 18 and 21 is varied. Other parameters employed in both experiments are listed in Tables 1 and 2.

TABLE 1

| | |
|---|---|
| $k_1$ | 106.1 Nm/rad |
| $J_1$ | $4.2 \times 10^{-4}$ kgm$^2$ |
| Diameter $R_1$ of pulley 18 | 56 mm |
| Diameter $R_2$ of pulley 21 | 14 mm |
| Speed increasing ratio $R_1/R_2$ | 4 |
| Pulley material | Glass fiber reinforced resin |
| Belt length | 340 mm |
| Belt width | 10 mm |
| Belt material | Glass fiber core rubber |
| Diameter of shaft 14 of photosensitive drum 4 | 16 mm |
| Diameter of flywheel 20 | 100 mm |
| Thickness of flywheel 20 | 20 mm |
| J | $1.54 \times 10^{-3}$ kgm$^2$ |
| $J_2$ | $24.6 \times 10^{-3}$ kgm$^2$ |

TABLE 2

| | |
|---|---|
| $k_1$ | 106.1 Nm/rad |
| $J_1$ | $4.2 \times 10^{-4}$ kgm$^2$ |
| Diameter $R_1$ of pulley 18 | 80 mm |
| Diameter $R_2$ of pulley 21 | 20 mm |
| Speed increasing ratio $R_1/R_2$ | 4 |
| Pulley material | Glass fiber reinforced resin |
| Belt length | 340 mm |
| Belt width | 10 mm |
| Belt material | Glass fiber core rubber |
| Diameter of shaft 14 of photosensitive drum 4 | 16 mm |
| Diameter of flywheel 20 | 100 mm |
| Thickness of flywheel 20 | 20 mm |
| J | $1.54 \times 10^{-3}$ kgm$^2$ |
| $J_2$ | $24.6 \times 10^{-3}$ kgm$^2$ |

In FIGS. 17 and 18, "$f_{O1}$" corresponds to such a frequency at which a gain between the lower vibration amplification range and the attenuation range shown in FIG. 10 becomes 0 dB, whereas "$f_{O2}$" corresponds to such a frequency at which a gain between the higher vibration amplification range and the attenuation range becomes 0 dB. That is to say, a range between the frequency $f_{O1}$ and the frequency $f_{O2}$ becomes an attenuation range.

Figure 19:
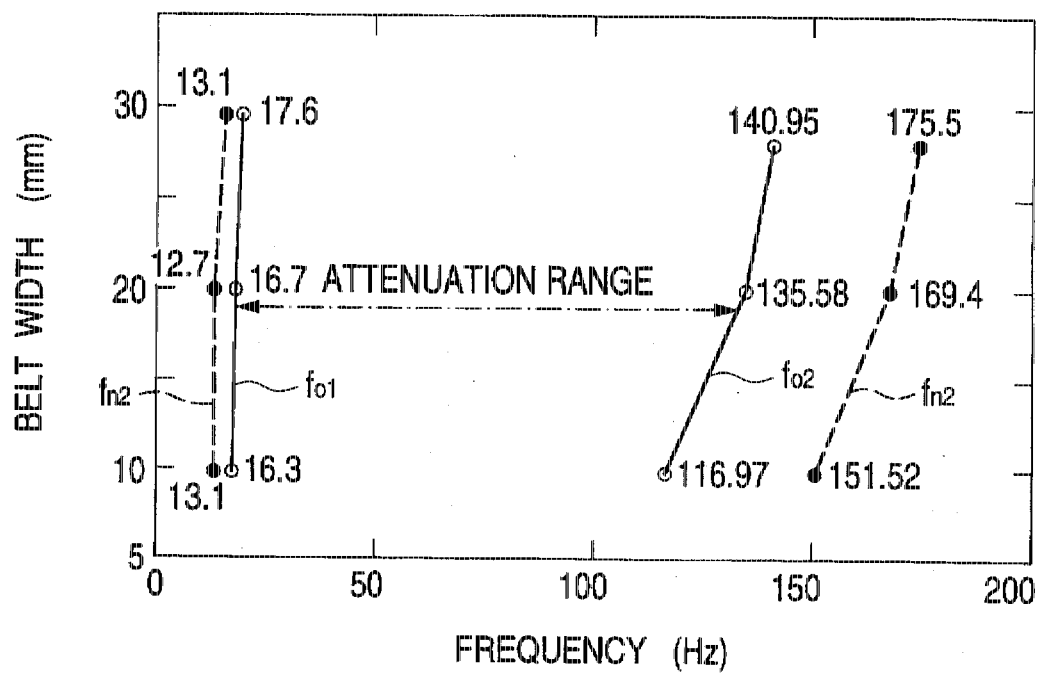
FIG. 19 is a graph for indicating an experimental result obtained by investigating differences such as natural frequencies when a width of the endless belt is varied in the First Embodiment.
Figure 20:
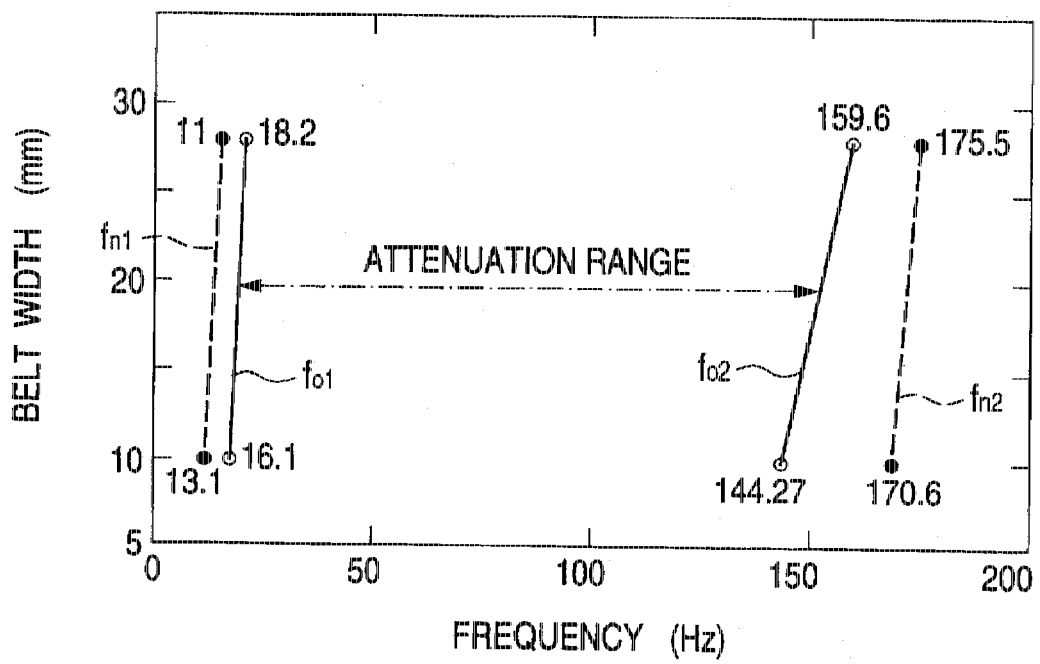
FIG. 20 is a graph for indicating another experimental result obtained by investigating differences such as natural frequencies when the width of the endless belt is varied in the First Embodiment.

FIGS. 19 and 20 indicate results obtained by investigating a vibration attenuation characteristic when the width of the endless belt 22 is varied. Other parameters employed in both experiments are listed up in Tables 3 and 4.

TABLE 3

| | |
|---|---|
| $k_1$ | 106.1 Nm/rad |
| $J_1$ | $4.2 \times 10^{-4}$ kgm$^2$ |
| Diameter $R_1$ of pulley 18 | 56 mm |
| Diameter $R_2$ of pulley 21 | 14 mm |
| Speed increasing ratio $R_1/R_2$ | 4 |
| Pulley material | Glass fiber reinforced resin |
| Belt length | 340 mm |
| Belt tension | 98N |
| Belt material | Glass fiber core rubber |
| Diameter of shaft 14 of photosensitive drum 4 | 16 mm |
| Diameter of flywheel 20 | 100 mm |
| Thickness of flywheel 20 | 20 mm |
| J | $1.54 \times 10^{-3}$ kgm$^2$ |
| $J_2$ | $24.6 \times 10^{-3}$ kgm$^2$ |

TABLE 4

| | |
|---|---|
| $k_1$ | 106.1 Nm/rad |
| $J_1$ | $4.2 \times 10^{-4}$ kgm$^2$ |
| Diameter $R_1$ of pulley 18 | 80 mm |

TABLE 4-continued

| | |
|---|---|
| Diameter $R_2$ of pulley 21 | 20 mm |
| Speed increasing ratio $R_1/R_2$ | 4 |
| Pulley material | Glass fiber reinforced resin |
| Belt length | 340 mm |
| Belt tension | 98N |
| Belt material | Glass fiber core rubber |
| Diameter of shaft 14 of photosensitive drum 4 | 16 mm |
| Diameter of flywheel 20 | 100 mm |
| Thickness of flywheel 20 | 20 mm |
| J | $1.54 \times 10^{-3}$ kgm$^2$ |
| $J_2$ | $24.6 \times 10^{-3}$ kgm$^2$ |

As apparent from FIGS. 17 to 20, when the tension and width of the endless belt 22 are increased, the spring constant $K_2$ is increased, and therefore the frequencies $f_{O2}$ and $f_{n2}$ were considerably increased, although the frequencies $f_{n1}$ and $f_{O1}$ were not substantially changed.

Figure 21:
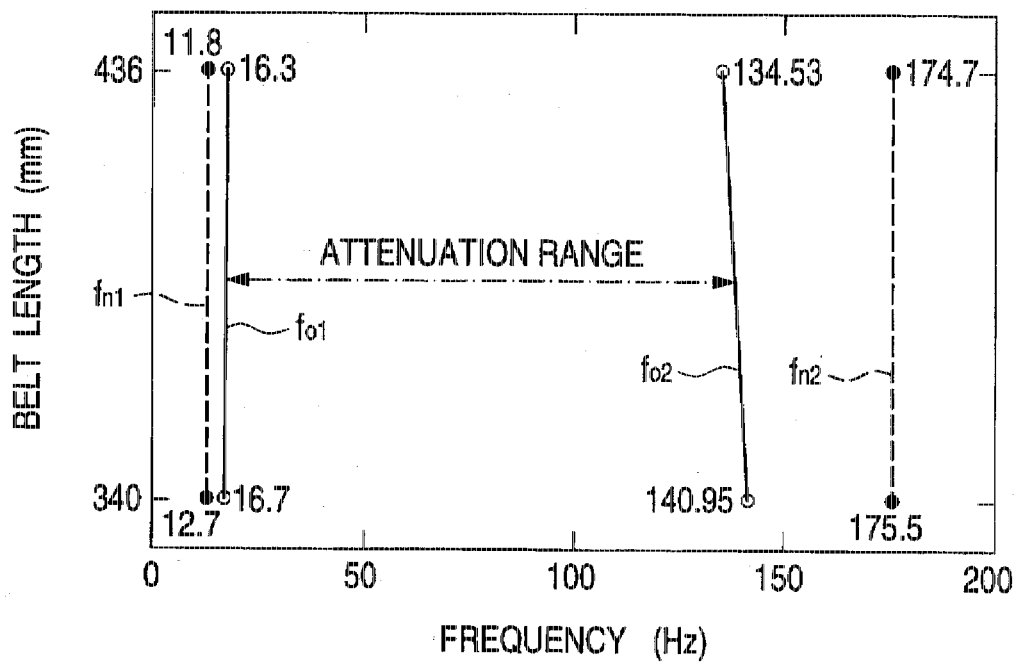
FIG. 21 is a graph for indicating an experimental result obtained by investigating differences such as natural frequencies when a length of an endless belt is varied in the First Embodiment.

Next, FIG. 21 represents a result obtained by investigating a vibration attenuation characteristic when a distance between the shaft of the pulley 18 and the shaft of the pulley 21 is varied, and the length of the endless belt 2 is changed. Other parameters employed in this experiment are listed up in Table 5.

TABLE 5

| | |
|---|---|
| $k_1$ | 106.1 Nm/rad |
| $J_1$ | $4.2 \times 10^{-4}$ kgm$^2$ |
| Diameter $R_1$ of pulley 18 | 80 mm |
| Diameter $R_2$ of pulley 21 | 20 mm |
| Speed increasing ratio $R_1/R_2$ | 4 |
| Pulley material | Glass fiber reinforced resin |
| Belt tension | 98N |
| Belt width | 10 mm |
| Belt material | Glass fiber core rubber |
| Diameter of shaft 14 of photosensitive drum 4 | 16 mm |
| Diameter of flywheel 20 | 100 mm |
| Thickness of flywheel 20 | 20 mm |
| J | $1.54 \times 10^{-3}$ kgm$^2$ |
| $J_2$ | $24.6 \times 10^{-3}$ kgm$^2$ |

If the length of the endless belt 22 is shortened, then a ratio of belt portions supported by the pulleys 19 and 20 becomes large. In other words, since the spring constant $k_2$ is increased, the frequencies $f_{O2}$ and $f_{n2}$ were only slightly increased.

Figure 22:
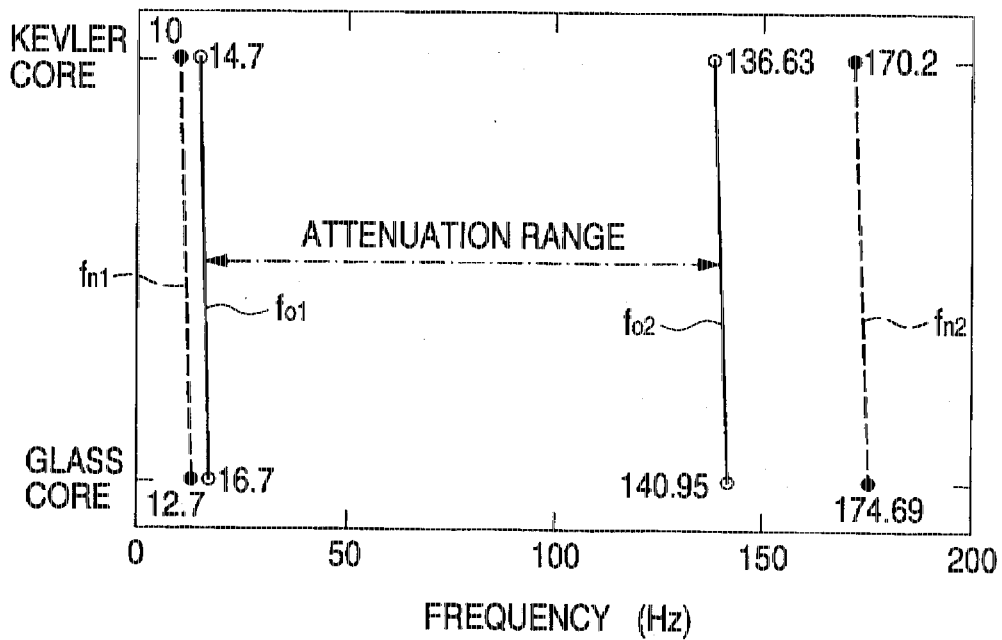
FIG. 22 is a graph for representing an experimental result obtained by investigating differences such as natural frequencies when a material of the endless belt is varied in the First Embodiment.

FIG. 22 represents a result acquired by checking a vibration attenuation characteristic when the material of the endless belt 22 is varied. Other parameters employed in this experiment is listed up in Table 6.

TABLE 6

| | |
|---|---|
| $k_1$ | 106.1 Nm/rad |
| $J_1$ | $4.2 \times 10^{-4}$ kgm$^2$ |
| Diameter $R_1$ of pulley 18 | 80 mm |
| Diameter $R_2$ of pulley 21 | 20 mm |
| Speed increasing ratio $R_1/R_2$ | 4 |
| Pulley material | Glass fiber reinforced resin |
| Belt tension | 98N |
| Belt width | 10 mm |
| Belt length | 340 mm |
| Diameter of shaft 14 of photosensitive drum 4 | 16 mm |
| Diameter of flywheel 20 | 100 mm |
| Thickness of flywheel 20 | 20 mm |
| J | $1.54 \times 10^{-3}$ kgm$^2$ |
| $J_2$ | $24.6 \times 10^{-3}$ kgm$^2$ |

In FIG. 22, a Kevler core implies a belt manufactured by that a Kevler fiber is used as a core, and a surface layer is made of rubber. A glass core implies a rubber belt manufactured by that a glass fiber is used as a core, and a surface layer is made of rubber. When the glass fiber is employed, the rigidity thereof can be increased, so that the frequencies $f_{o2}$ and $f_{n2}$ can be increased.

Figure 23:
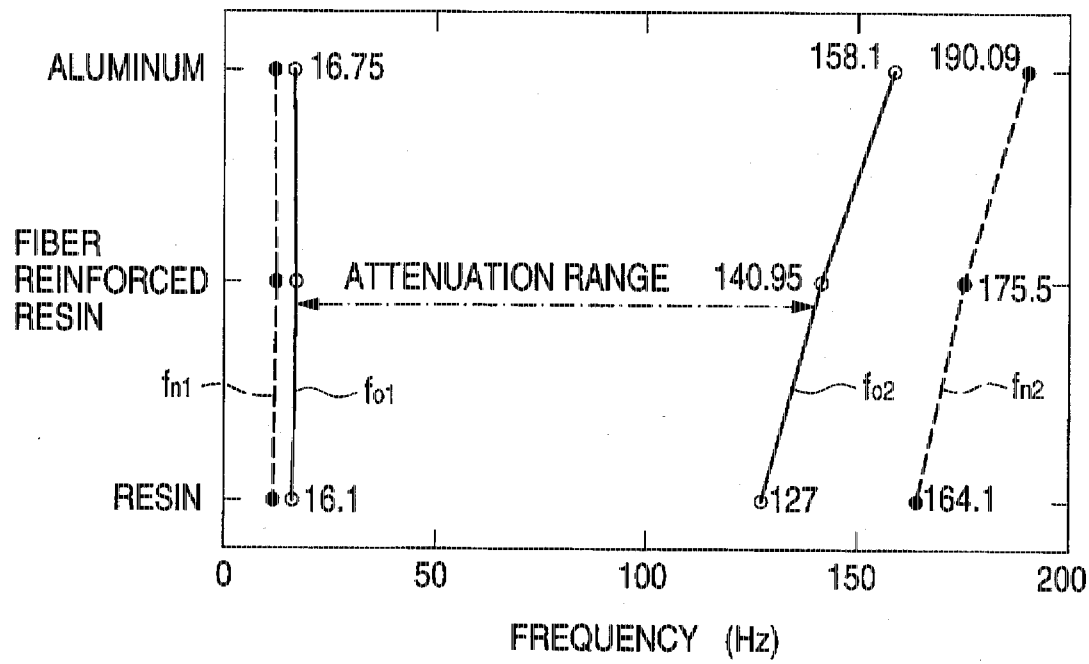
FIG. 23 is a graph for representing an experimental result obtained by checking differences such as natural frequencies when a material of a pulley is changed in the First Embodiment.

FIG. 23 indicates a result obtained by checking a vibration attenuation characteristic when the materials of the pulleys 18 and 21 are varied. This experiment was carried out with respect to three sorts of materials such as aluminum, glass fiber reinforced resin, and resin. Other parameters used in this experiment are listed up in Table 7.

TABLE 7

| | |
|---|---|
| $k_1$ | 106.1 Nm/rad |
| $J_1$ | $4.2 \times 10^{-4}$ kgm$^2$ |
| Diameter $R_1$ of pulley 18 | 80 mm |
| Diameter $R_2$ of pulley 21 | 20 mm |
| Speed increasing ratio $R_1/R_2$ | 4 |
| Belt tension | 98N |
| Belt width | 10 mm |
| Belt length | 340 mm |
| Belt material | Glass fiber core rubber |
| Diameter of shaft 14 of photosensitive drum 4 | 16 mm |
| Diameter of flywheel 20 | 100 mm |
| Thickness of flywheel 20 | 20 mm |
| J | $1.54 \times 10^{-3}$ kgm$^2$ |
| $J_2$ | $24.6 \times 10^{-3}$ kgm$^2$ |

The following understandings could be obtained from this experimental result. That is, the higher the rigidity of the materials for the pulleys 18 and 21 becomes, the higher the rigidity of the entire system is increased. Therefore, the frequencies $f_{o2}$ and $f_{n2}$ could be increased.

Figure 24:
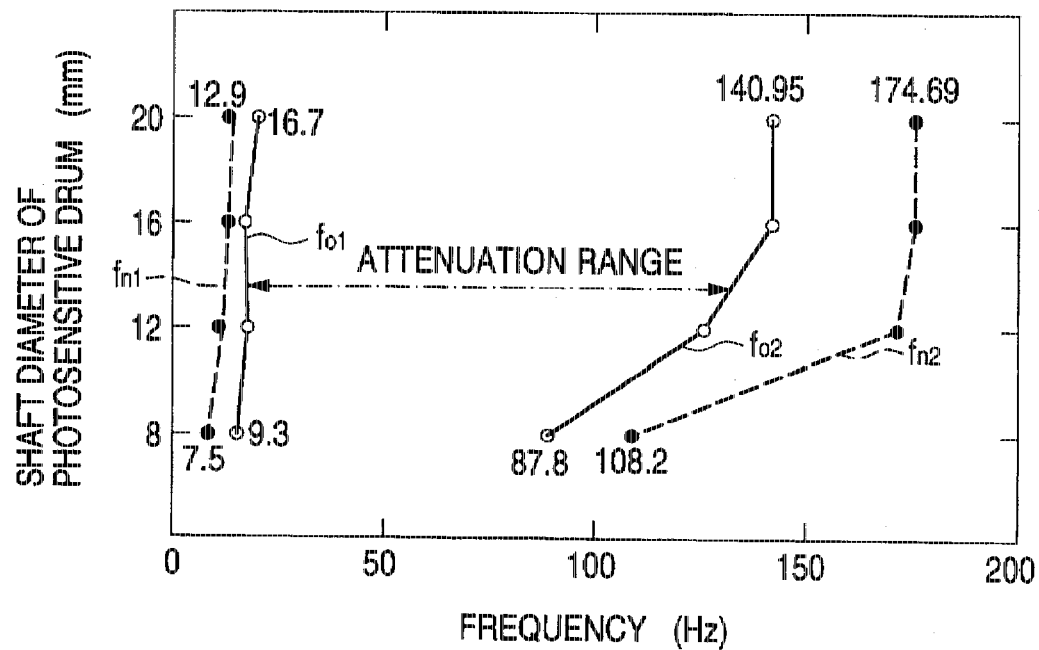
FIG. 24 is a graph for showing an experimental result obtained by checking differences such as natural frequencies when a diameter of a shaft of the image carrier is changed in the First Embodiment.

Subsequently, FIG. 24 shows a result obtained by investigating a vibration attenuation characteristic when the diameter of the shaft 14 of the photosensitive drum 4 is changed. Other parameters employed in this experiment is listed up in Table 8.

TABLE 8

| | |
|---|---|
| $k_1$ | 106.1 Nm/rad |
| $J_1$ | $4.2 \times 10^{-4}$ kgm$^2$ |
| Diameter $R_1$ of pulley 18 | 80 mm |
| Diameter $R_2$ of pulley 21 | 20 mm |
| Speed increasing ratio $R_1/R_2$ | 4 |
| Pulley material | Glass fiber reinforced resin |
| Belt tension | 98N |
| Belt width | 10 mm |
| Belt length | 340 mm |
| Belt material | Glass fiber core rubber |
| Diameter of flywheel 20 | 100 mm |
| Thickness of flywheel 20 | 20 mm |
| J | $1.54 \times 10^{-3}$ kgm$^2$ |
| $J_2$ | $24.6 \times 10^{-3}$ kgm$^2$ |

Since the diameter of the shaft 14 is increased, the spring constant $k_2$ is increased. Accordingly, although there is substantially no change in the frequencies $f_{n1}$ and $f_{o1}$, the frequencies $f_{o2}$, $f_{n2}$ are greatly increased.

Figure 25:
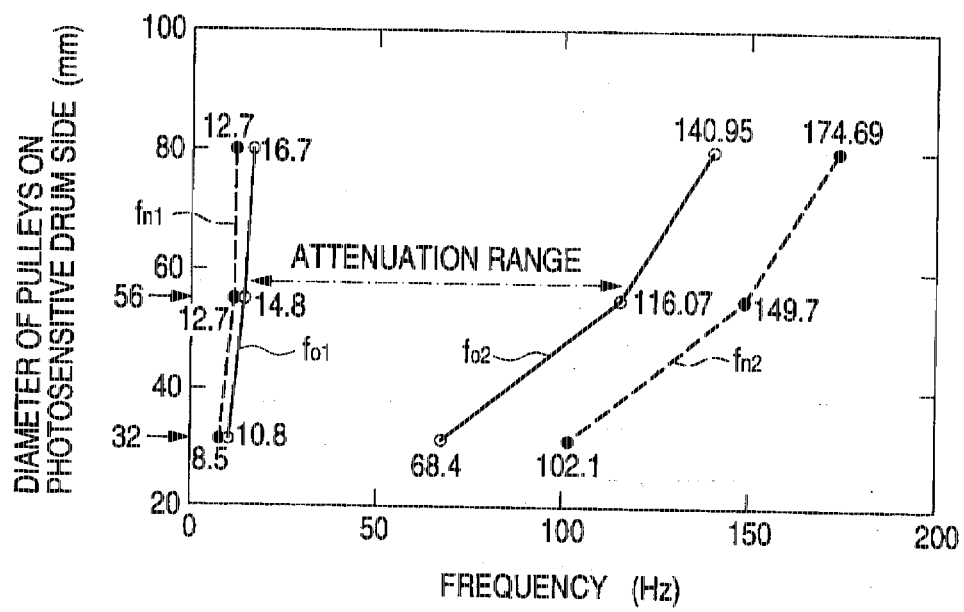
FIG. 25 is a graph for representing an experimental result obtained by checking differences such as natural frequencies when a diameter of the pulley is changed in the First Embodiment.

Moreover, FIG. 25 represents a result obtained by checking a vibration attenuation characteristic when the diameter of the pulley 18 provided on the side of the photosensitive drum 4 is changed. In this case, in conjunction with the changes in the diameter ($2R_1$) of the pulley 18, the diameter ($2R_2$) of the pulley 21 was changed, and thus the speed increasing ratio $R_1/R_2$ was kept constant. Parameters employed in this experiment are listed up in Table 9.

TABLE 9

| | |
|---|---|
| $k_1$ | 106.1 Nm/rad |
| $J_1$ | $4.2 \times 10^{-4}$ kgm$^2$ |
| Speed increasing ratio $R_1/R_2$ | 4 |
| Pulley material | Glass fiber reinforced resin |
| Belt tension | 98N |
| Belt width | 10 mm |
| Belt length | 340 mm |
| Belt material | Glass fiber core rubber |
| Diameter of shaft 14 of photosensitive drum 4 | 16 mm |
| Diameter of flywheel 20 | 100 mm |
| Thickness of flywheel 20 | 20 mm |
| J | $1.54 \times 10^{-3}$ kgm$^2$ |
| $J_2$ | $24.6 \times 10^{-3}$ kgm$^2$ |

As apparent from FIG. 25, when the diameters of the pulleys 18 and 21 are made large, although the frequencies $f_{n1}$ and $f_{o1}$ are not substantially varied, the frequencies $f_{o2}$ and $f_{n2}$ are considerably increased. As one of these reasons, it is conceivable that when the diameters of the pulleys 18 and 21 are increased, a ratio of belt portions supported by the endless belt 22 having the same length becomes large, and thus the spring constant $k_2$ is increased. Since the diameters of these pulleys 18 and 21 are large, the rotary angles of the pulleys 18 and 21 may be made small with respect to the same extension of the endless belt 22 suspended on the pulleys 18 and 21. This may be conceived from such a fact that deviation is decreased for the same excitation (drive) force, and therefore the spring constant $k_2$ is increased.

It should be noted that in the experiments where the spring constants $k_2$ of the above-described systems (FIG. 17 to FIG. 25), the largest influence was given to the frequencies $f_{o2}$ and $f_{n2}$ when the diameter of the pulley 18 was changed.

Figure 26:
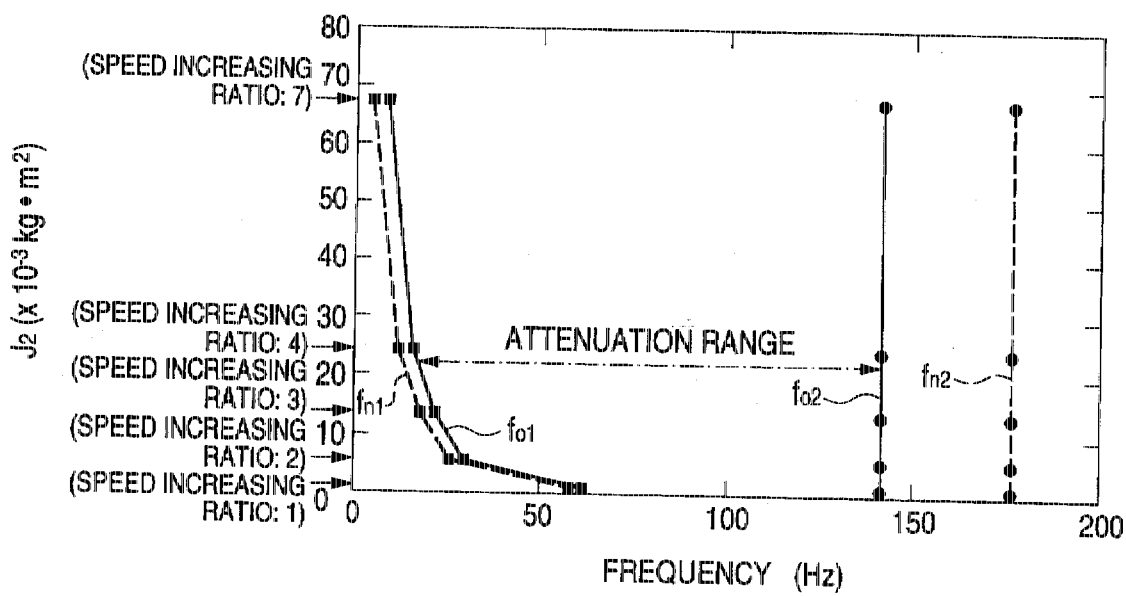
FIG. 26 is a graph for showing an experimental result obtained by checking differences such as natural frequencies when a speed increasing ratio by the pulley is changed in the First Embodiment.

Next, FIG. 26 shows a calculation result of a vibration attenuation characteristic when the speed increasing ratio $R_1/R_2$ is changed. In this experiment, while the diameter ($2R_1$) of the pulley 18 provided on the side of the photosensitive drum 4 was 100 mm, the diameter ($2R_2$) of the pulley 21 provided on the side of the flywheel 20 was changed, so that the speed increasing ratio $R_1/R_2$ was changed. Other parameters employed in this calculation are listed up in Table 10.

TABLE 10

| | |
|---|---|
| $k_1$ | 106.1 Nm/rad |
| $J_1$ | $4.2 \times 10^{-4}$ kgm$^2$ |
| $k_2$ | 225 Nm/rad |
| Diameter of flywheel 20 | 100 mm |
| Thickness of flywheel 20 | 20 mm |
| J | $1.54 \times 10^{-3}$ kgm$^2$ |

When the speed increasing ratio $R_1/R_2$ is increased, even if the inertia moment J of the flywheel 20 is constant, since the inertia moment $J_1$ of the system is increased, the frequencies $f_{o1}$ and $f_{n1}$ are considerably decreased. However, there is substantially no adverse influence to the frequencies $f_{n2}$ and $f_{o2}$. To extend the attenuation range, it is desirable to lower the frequency $f_{o1}$. In an actual use, it is sufficient when the vibrations are attenuated to a certain degree at which an image shift (deviation) can be visually recognized. Therefore, such a very low frequency, for instance, frequencies near 1 Hz need not be entered into the attenuation. It should be understood that since the rotation (revolution) number of the motor 5 normally employed in the image forming apparatus is selected from approximately 15 Hz to about 30 Hz (namely, from 15 rps to 30 rps), the frequency of approximately 15 Hz may be preferably attenuated. As a consequence, it is desired to set the speed increasing ratio $R_1/R_2$ more than four times under conditions listed in Table 10.

Figure 27:
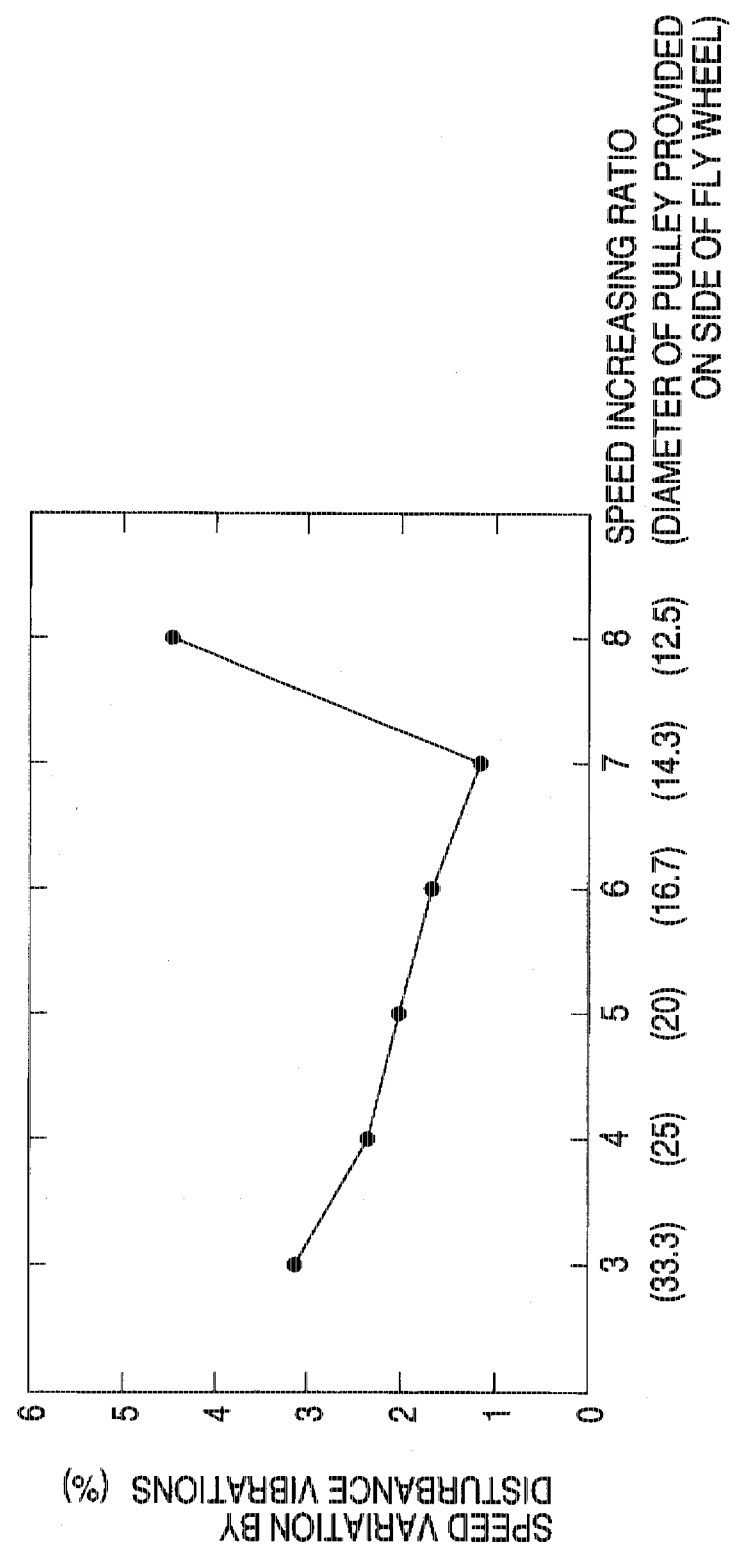
FIG. 27 is a graph for indicating an experimental result by checking speed variations of the image carrier caused by disturbance vibrations when the speed increasing ratio of the pulley is changed in the First Embodiment.

Next, FIG. 27 shows a result obtained by checking a vibration attenuation characteristic when the speed increasing ratio $R_1/R_2$ is changed. Also, in this case, while the diameter ($2R_1$) of the pulley 18 provided on the side of the photosensitive drum 4 was 100 mm, the diameter ($2R_2$) of the pulley 21 provided on the side of the flywheel 20 was changed, so that the speed increasing ratio $R_1/R_2$ was changed. Then, a maximum speed variation was measured when preselected shocking force was applied to the photosensitive drum 4. Other parameters employed in this experiment are listed up in Table 11.

TABLE 11

| | |
|---|---|
| $k_1$ | 106.1 Nm/rad |
| $J_1$ | $4.2 \times 10^{-4}$ kgm$^2$ |
| Speed increasing ratio $R_1/R_2$ | 4 |
| Belt tension | 98N |
| Belt width | 10 mm |
| Belt length | 340 mm |
| Belt material | Glass fiber core rubber |
| Diameter of shaft 14 of photosensitive drum 4 | 16 mm |
| Diameter of flywheel 20 | 100 mm |
| Thickness of flywheel 20 | 20 mm |
| J | $1.54 \times 10^{-3}$ kgm$^2$ |
| $J_2$ | $24.6 \times 10^{-3}$ kgm$^2$ |

As apparent from FIG. 27, the larger the speed increasing ratio becomes, the larger the suppression effect for the disturbance could become until the speed increasing ratio $R_1/R_2$ is equal to 7. This is because the above-described effects achieved when the inertia energy is increased are obtained rather than the variations in the variables in Formula 4. As previously explained an image forming apparatus may employ a movable developing device, a movable transfer device, and a movable cleaning blade. When these devices are in contact with/separated from the image carrier, the instantaneous acceleration/deceleration of the image carrier would be induced. Even when the speed variation of the sheet transport roller is propagated via the sheet for forming the image and/or the speed variation of the developing roller of the developing device mode in contact with the image carrier is propagated, vibrations are produced in the image carrier. A confirmation could be made for such disturbance vibrations in that the larger the speed increasing ratio $R_1/R_2$ becomes, the higher the suppression effect for the disturbance becomes.

It should be understood that when the speed increasing ratio $R_1/R_2$ is equal to 8, the suppression effect thereof is lowered. This is because the contact area between the peripheral surface of the pulley 21 (namely corresponding to a smaller pulley) provided on the side of the flywheel 20, and the endless belt 22 becomes small, so that slips between both members may be easily produced. As a result, it is preferable when $R_1/R_2$ is smaller than 8, and it is further preferable when $R_1/R_2$ is smaller than, or equal to 7. In other words, the pulleys 19 and 21 are mainly made of the resin. In the case that the surface layer of the endless belt 22 is made of rubber, it is desirable when the diameter of the pulley 21 is made larger than ⅛ of the diameter of the pulley 19. Furthermore, it is preferable when the diameter of this pulley 21 is made larger than, or equal to ⅐ of the diameter of the pulley 19.

As previously described, it could be proven that the vibration attenuation range could be controlled by varying the various sorts of parameters.

Figure 28:
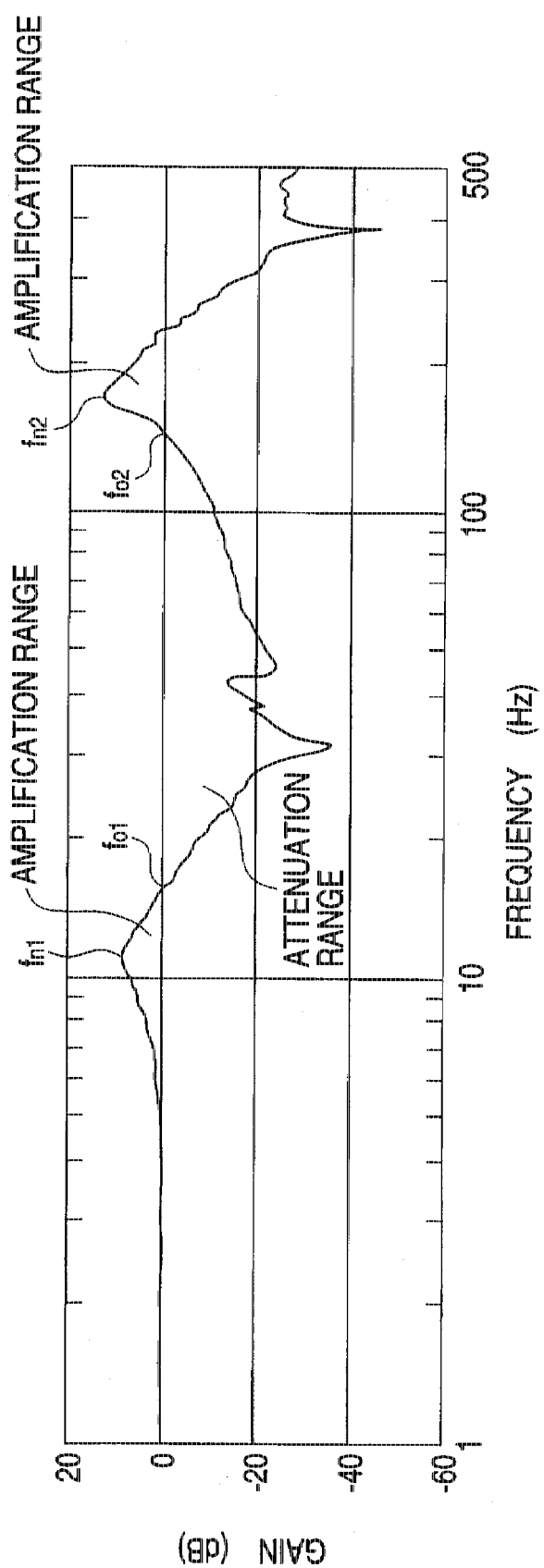
FIG. 28 is a graph for showing a vibration amplification/attenuation characteristic for the respective frequencies when parameters suitable for expanding the vibration attenuation frequency range from the above experimental result are selected.

FIG. 28 indicates an experimental result obtained by measuring a vibration attenuation characteristic, while selecting suitable parameters (the best parameter, or the second best parameter in view of economical point) so as to extend the attenuation range from the above-explained experimental results. The parameters are listed up in Table 12.

TABLE 12

| | |
|---|---|
| $k_1$ | 106.1 Nm/rad |
| $J_1$ | $4.2 \times 10^{-4}$ kgm$^2$ |
| Diameter $R_1$ of pulley 18 | 80 mm |
| Diameter $R_2$ of pulley 21 | 16 mm |
| Speed increasing ratio $R_1/R_2$ | 5 |
| Pulley material | Glass fiber reinforced resin |
| Belt tension | 98N |
| Belt width | 10 mm |
| Belt length | 340 mm |
| Belt material | Glass fiber core rubber |
| Diameter of shaft 14 of photosensitive drum 4 | 16 mm |
| Diameter of flywheel 20 | 100 mm |
| Thickness of flywheel 20 | 20 mm |
| J | $1.54 \times 10^{-3}$ kgm$^2$ |
| $J_2$ | $24.6 \times 10^{-3}$ kgm$^2$ |

In the experiment of FIG. 28, the frequency $f_{n1}$ was 11.3 Hz, the frequency $f_{o1}$ was 13.8 Hz, the frequency $f_{o2}$ was 141 Hz, and the frequency $f_{n2}$ was 176 Hz. That is, the frequencies from 13.8 to 176 Hz could be obtained as the attenuation range between two sets of amplification ranges.

Also, in the drive apparatus 4 with using the parameters of Table 12, the speed variation spectrum of the photosensitive drum 4 was analyzed by way of the Fast Fourier transform. Table 13 is to calculate such frequencies greatly generated in this drive apparatus 4. A diameter of the photosensitive drum 4 is selected to be 84 mm.

TABLE 13

| | Shaft of motor 5 | | Rotary shaft 10 | | Rotary shaft 11 | |
|---|---|---|---|---|---|---|
| Rotation number (rps) | 14.4 | | 0.8 | | 0.267 | |
| Teeth number of mounted gear | 8 | | 48 | | 144 | 144 |
| Generated frequency (Hz) | 14.4 | 115.2 | 0.8 | 38.4 | 115.2 | 0.267 | 38.4 |

Figure 29:
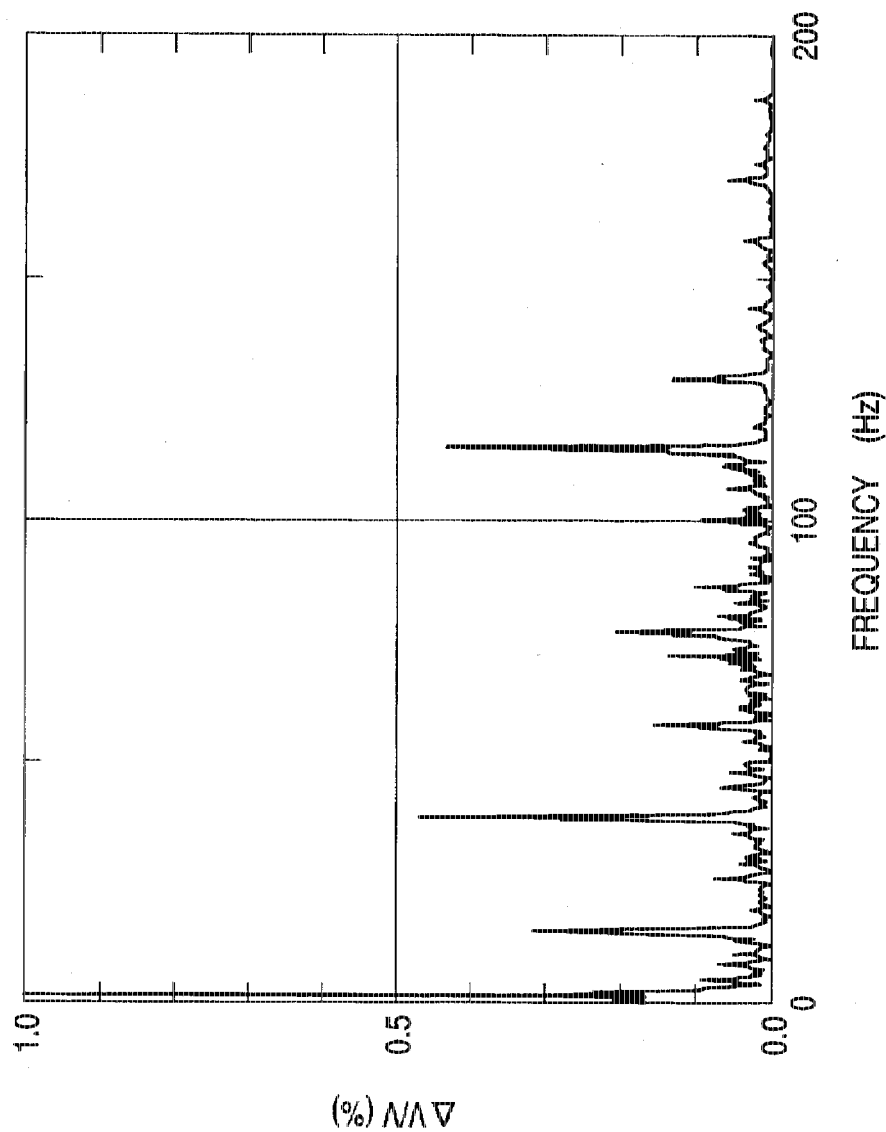
FIG. 29 is a graph for representing a vibration attenuation characteristic for the respective frequencies of the drive apparatus without having the vibration attenuation measure, to which the vibration attenuation shown in FIG. 28 will be applied.

As indicated in Table 13, there is a risk that vibrations having frequencies of 0.267, 0.8, 14.4, 38.4, and 115.2 are greatly applied. FIG. 29 indicates a speed variation spectrum in such a case that no measurement for vibration attenuations is introduced, in which peaks corresponding to these frequencies are produced.

Here, since the diameter of the photosensitive drum 4 is 84 mm, the peripheral speed of the photosensitive drum 4 becomes 70.4 mm/s based on the rotation number thereof, i.e. 0.267 rps (see Table 13). Assuming that the peripheral speed of the photosensitive drum 4 is selected to be P mm/s, the vibration having the frequency of 38.4 Hz which is most close to at least 70 Hz in Table 13 is preferable located within the attenuation range, considering a rule of thumb. That is, the vibration having the frequency of P Hz may most probably induce an image shift visually recognized. Based upon the result of FIG. 28, since the attenuation range when the parameters of Table 12 are selected corresponds to 13.8 Hz to 176 Hz, it is conceivable that the vibrations having not only the frequency of 38.4 Hz in Table 13, but also the frequencies of 14.4 Hz and 115.2 Hz can be attenuated.

Figure 30:
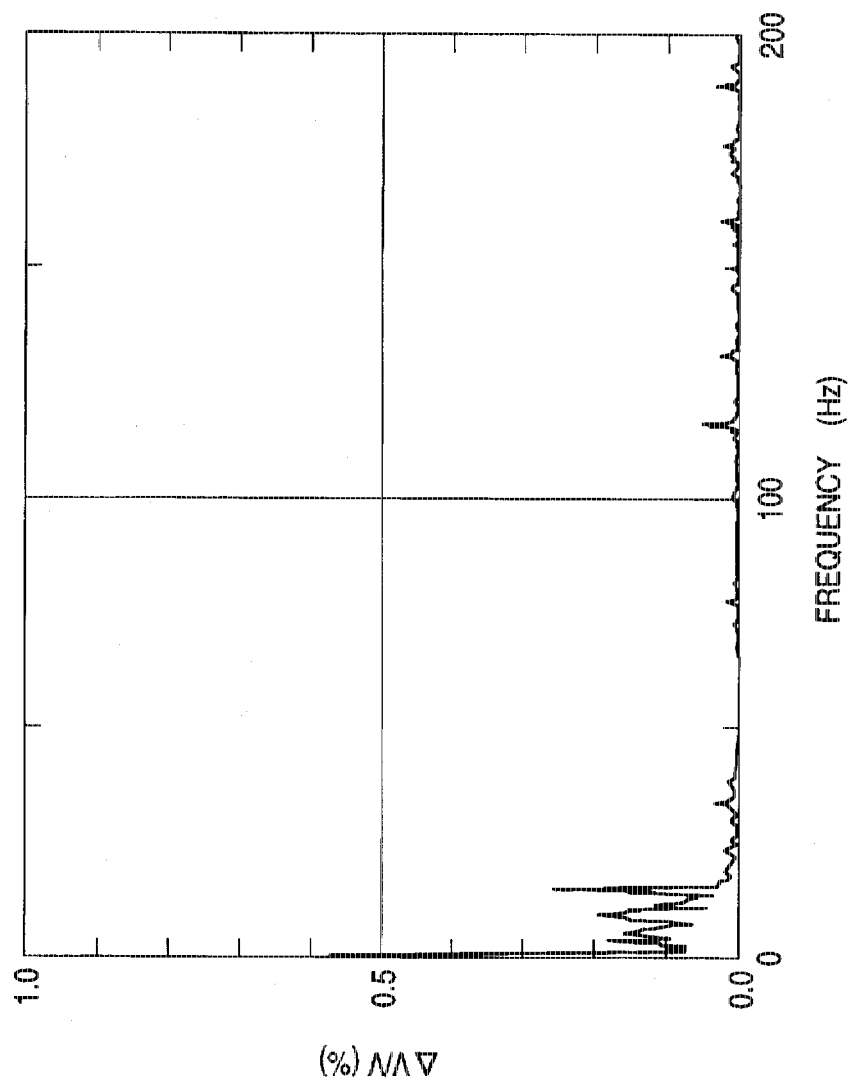
FIG. 30 is a graph for indicating a speed variation spectrum of the image carrier, which is analyzed by the Fast Fourier transform when the vibration attenuation of FIG. 28 is applied to the drive apparatus of FIG. 29.

FIG. 30 shows a speed variation spectrum when the variations are attenuated by the drive apparatus according to the embodiment of the present invention with employment of the parameters shown in Table 12. As apparent from FIG. 30, the vibrations located in the attenuation range, namely 13.8 Hz to 176 Hz could be greatly attenuated. It should be noted that although the vibrations present in the frequency range near 0.267 Hz and 0.8 Hz could not be attenuated, this gives substantially no adverse influence to the visually observed image shaft. As previously explained, it is possible to suppress the vibrations in all of the frequencies by which the visually observed images are adversely influenced, and these vibrations are most probably produced in large amplitudes.

Figure 31:
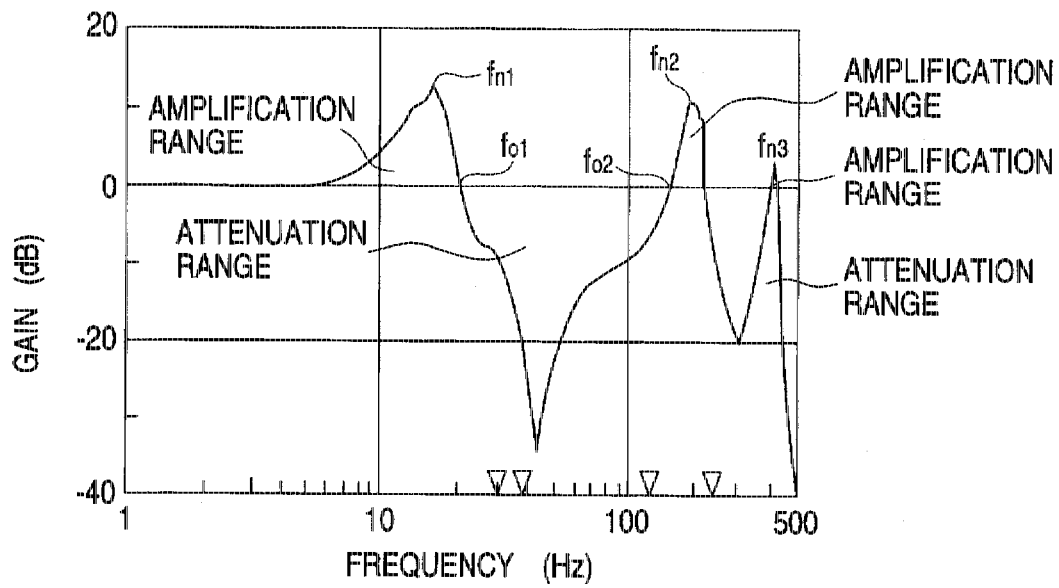
FIG. 31 is a graph for indicating a vibration amplification/attenuation characteristic for the respective frequencies of the drive apparatus according to a modification of the First Embodiment.

On the other hand, there is another measure such that not only all of the frequencies capable of inducing a visually recognizable image shift are entered into the attenuation range ($f_{o1}$ to $f_{o2}$) between the amplification range and the attenuation range, but also vibration attenuations are carried out in the frequency range other than this frequency range. Referring now to FIG. 31, this measure will be explained. In FIG. 31, triangular symbols represent vibration generating frequencies at which visually recognizable image shifts are produced. In this case, frequencies of 29.1 Hz, 38.68 Hz, 116.04 Hz and 232.08 Hz correspond to vibration generating frequencies at which large vibrations might be produced. Among these frequencies, 29.1 Hz is the rotation frequency (29.1 rps) of the motor 5, and other frequencies are such frequencies produced when the gears 6 to 9 are meshed with each other.

In this case, as shown in FIG. 31, a vibration amplification/attenuation characteristic of the drive apparatus may be set. In other words, the higher amplification range near the higher natural frequency $f_{n2}$ is not set to be higher than the highest generating frequency of 232.08 Hz, but is set to frequencies defined between the highest generating frequency of 232.08 Hz and the second highest generating frequency of 116.04 Hz. By setting the frequency in this manner, the vibrations having the frequencies of 29.1 Hz, 38.68 Hz, and 116.04 Hz are entered into the attenuation range from $f_{o1}$ to $f_{o2}$ to thereby be attenuated. On the other hand, the vibration having the frequency of 232.08 Hz is entered into the higher attenuation than the higher amplification region near the frequency of $f_{n2}$ to thereby be attenuated. As a result, the vibrations which may adversely influence the visually observed image can be attenuated in the entire system of the drive apparatus.

It should be noted that the diameter of the photosensitive drum 4 is selected to be 84 mm, and the rotation number thereof is selected to be 0.267 rps (since this rotation number itself is low, there is no adverse influence given to the visually observed image, so that it is not indicated by the triangular symbol in FIG. 31). As a consequence, the peripheral speed of the photosensitive drum 4 becomes 70.4 mm/s, and thus the vibration having the frequency of 38.68 Hz most close to at least 70 Hz is preferably located in the attenuation range, in view of thumb rule. As previously explained, not only the vibration having the frequency of 38.68 Hz, but also the vibrations having the frequencies of 29.1 Hz and 116.04 Hz are attenuated, so that this purpose could be achieved.

In FIG. 31, not only the natural frequencies $f_{n1}$ and $f_{n2}$, but also another natural frequency $f_{n3}$ are produced. This natural frequency may be conceivably produced due to elastic characteristics of the couplings 12 and 13. This natural frequency $f_{n3}$ may be calculated by substituting $J_1$ (inertia moment of photosensitive drum 4) and $k_1$ (spring constants of couplings 12, 13) for Formula 2. It should be noted that a gain of an amplification range near the natural frequency $f_{n3}$ is low, and another attenuation range is located in frequencies higher than this natural frequency.

Figure 32:
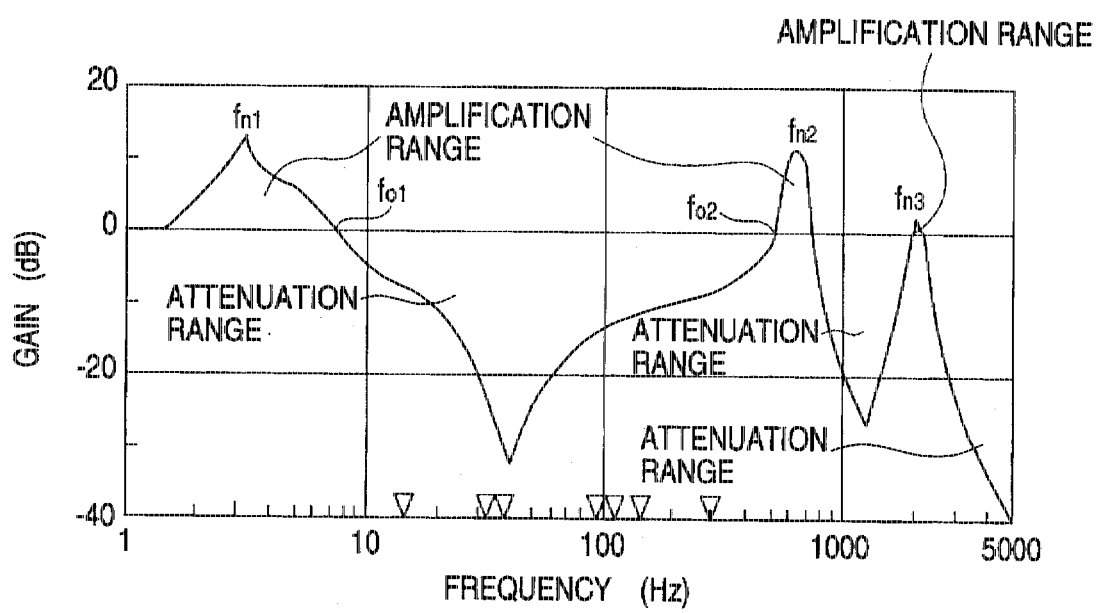
FIG. 32 is a graph for indicating a vibration amplification/attenuation characteristic for the respective frequencies of the drive apparatus according to another modification of the First Embodiment.

Next, FIG. 32 indicates a vibration amplification/attenuation characteristic in another drive apparatus. As explained above, although the spring constant $k_1$ and the inertia moment $J_1$ cannot be substantially varied within one image forming apparatus, both the spring constant $k_1$ and the inertia moment $J_1$ are different from those of the above-explained one image forming apparatus, which are specific to another image forming apparatus having a completely different specification. Thus, there are some cases that attenuation ranges may be easily extended. In particular, the inertia moment $J_1$ may be considerably reduced by decreasing the diameter of the photosensitive drum 4. FIG. 32 represents such an example.

Also, in FIG. 32, triangular symbols show vibration generating frequencies (15.14 Hz, 32.985 Hz, 48.95 Hz, 92.47 Hz, 106.98 Hz, 155.93 Hz, 296.86 Hz) at which image shifts can be visually confirmed. In this figure, 32.985 Hz corresponds to the rotation frequency of the motor 5, 15.14 Hz corresponds to the rotation frequency of the intermediate shaft 10, and other frequencies corresponds to the frequencies produced by meshing the gears 6 to 9 with each other. It should be noted that the diameter of the photosensitive drum 4 is selected to be 80 mm, and the rotation number thereof is selected to be 1.84 rps (since this rotation number itself is low, there is no adverse influence given to the visually observed image, so that it is not indicated by the triangular symbol in FIG. 32). As a consequence, the peripheral speed of the photosensitive drum 4 becomes 173 mm/s, and thus the vibration having the frequency of 155.93 Hz most close to at least 173 Hz is preferably located in the attenuation range, in view of thumb rule.

In FIG. 32, the frequency $f_{o1}$ is equal to 6.9 Hz, and the frequency $f_{o2}$ is equal to 510 Hz. As a result, not only the frequency of 155.93 Hz, but also all of the vibration generating frequencies which may be greatly vibrated are entered into the attenuation ranges defined from $f_{o1}$ to $f_{o2}$. Thus, in the overall system of the drive apparatus, the vibrations which may give adverse influences to the visually observed images can be attenuated. It should be noted that also in FIG. 32, another natural frequency $f_{n3}$ caused by the elastic characteristic of the couplings 12 and 13 is produced.

It should also be noted that the rotary shaft 11 coupled to the shaft 14 of the photosensitive drum 4 is driven via the gear transfer mechanism constructed of the gears 6 to 9 by the drive motor 5 in the above-described embodiment. As explained above, the use of the gears substantially constituting the rigid body is preferable in view of easily specifying the rigidity of the vibration system (mainly, spring constant $k_1$). Alternatively, the rotary shaft 11 may be driven via another transfer mechanism. Further, the rotary shaft 14 of the photosensitive drum 4 may be directly rotated.

When the shaft of the photosensitive drum 4 is rotated via a meshing type transfer mechanism (for example, a geared belt and a geared pulley, a chain and a sprocket), vibrations having frequencies caused by this gear meshing operation are produced similar to such a case that the gears are meshed with each other. However, even in a case, according to the present invention, these vibrations caused by this gear meshing operation may be similarly reduced by employing the above-described measures.

(Second Embodiment)

Figure 33:
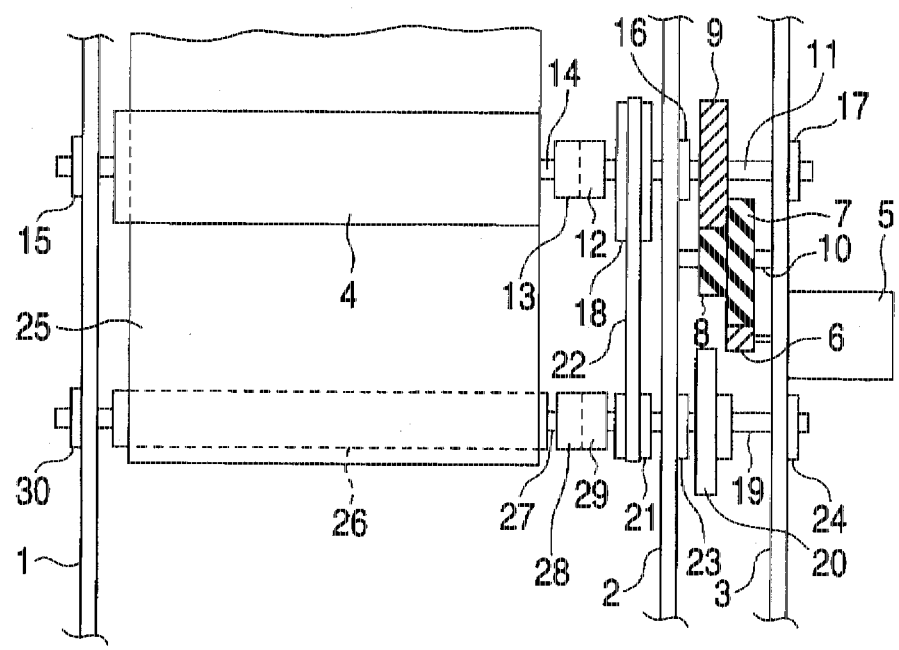
FIG. 33 is a plan view for showing a drive apparatus of an image carrier of an image forming apparatus according to the Second Embodiment of the present invention.

Next, FIG. 33 is a plan view for showing a drive apparatus of an image carrier of an image forming apparatus according to the Second Embodiment of the present invention. As represented in FIG. 33, in accordance with the Second Embodiment, an intermediate transfer belt (intermediate transfer member) 25 is interlocked by a wheel rotary shaft 19 for supporting a flywheel 20.

That is, the intermediate transfer belt 25 is traveled while being wounded on a roller 26 and other rollers. A shaft coupling 28 is fixed on an edge portion of a roller shaft (rotary shaft) 27 of the roller 26. Another shaft coupling 29 is fixed on an edge portion of the wheel rotary shaft 19. Then, these shaft couplings 28 and 29 are coupled with each other. It should be noted that reference numeral 30 indicates a bearing used to rotatably support the roller shaft 27 by way of the frame 1.

In this case, not only the rotation speed of the photosensitive drum 4 can be stabilized, but also the travel speed of the intermediate transfer belt 25 can be stabilized by employing a single flywheel 20, resulting in a higher efficiency.

It should also be noted that the roller 26 shown in this drawing may be a drive roller for applying drive force to the intermediate transfer belt 25, or a follow roller for traveling the intermediate transfer belt 25 while supporting this belt 25, but not for applying drive force thereto. In the former case, both the photosensitive drum 4 and the intermediate transfer belt 25 are driven by a single drive motor 5. In the latter case, the intermediate transfer belt 25 is traveled by other drive rollers. As a modification, either the endless belt 22 or the pulleys 19 and 21, as shown in FIG. 2 may be arranged.

(Application Examples)
(Application Example 1)

Figure 34:
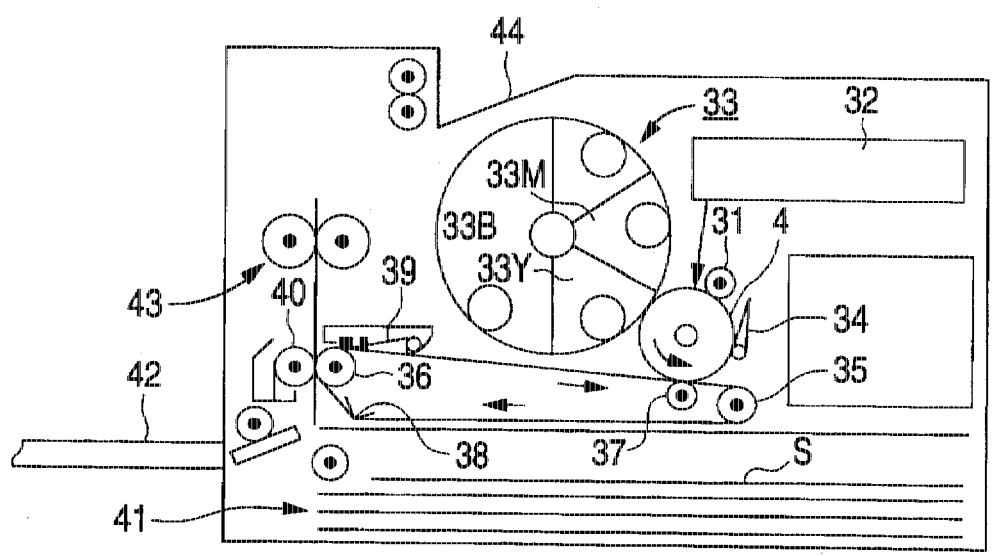
FIG. 34 is a side view for showing an application example according to the Embodiment.

FIG. 34 shows an example of an image forming apparatus to which the embodiment can be applied. As indicated in this figure, both the photosensitive drum 4 and the intermediate transfer belt 25 may be rotated, or traveled along arrow directions, while this photosensitive drum 4 is in contact with the intermediate transfer belt 25. Around the photosensitive drum 4, there are arranged a charger 31 capable of charging the surface of this photosensitive drum 4, an exposing device 32 for exposing the charged surface to form a latent image, a developing unit 33 for supplying toner to the latent image so as to develop this latent image, and a cleaner 34 for cleaning toner and the like left on the photosensitive drum 4.

The developing unit 33 is a rotary type developing unit equipped with developing devices 33B, 33Y, 33M and 33C, which supply black (B) toner, yellow (Y) toner, magenta (M) toner, and cyan (C) toner, respectively, to the photosensitive drum 4. While the toner image is supplied by any one of the developing devices, the photosensitive drum 4 transfers this toner image to the intermediate transfer belt 25. When a color image is formed, while driving the photosensitive drum 4 and the intermediate transfer belt 25, the above-explained four-colored toner images are stacked on the intermediate transfer belt 25.

The intermediate transfer belt 25 is wounded on the rollers 35 and 36, or is supported by a supporting plate 38, and then is traveled around these rollers 35, 36, and supporting plate 38. In this case, the roller 35 is employed as a drive roller, whereas the roller 36 is employed as a follow roller. A bias transfer roller 37 is arranged inside the intermediate transfer belt 25 at a contact position between the photosensitive drum 4 and the intermediate transfer belt 25. The toner on the photosensitive drum 4 is transferred to the intermediate transfer belt 25 by electric fields produced by this bias transfer roller 37.

Also, a movable cleaner 39 for cleaning toner left on the intermediate transfer belt 25, and a bias transfer roller 40 are arranged around the intermediate transfer belt 25. The intermediate transfer belt 25 can be positioned in contact with the bias transfer roller 40, and a sheet "S" is transported from either a paper tray 41 or a hand delivery tray 42 between these intermediate transfer belt 25 and bias transfer roller 40.

The toner formed on the intermediate transfer belt 25 is transferred onto this sheet S by electric fields produced from the bias transfer roller 40. After the toner has been transferred, the sheet S is transported to a fixing device 43 so as to be heated/pressured. Thus, the toner is fixed on the sheet S, and further the sheet S is ejected to an ejection tray 44.

In this image forming apparatus, similar to the drive apparatus according to the First Embodiment, only the rotations of the photosensitive drum 4 can be firstly stabilized. Also, the shaft of the drive roller 35 is coupled to the rotary shaft 11, so that the traveling operation of only the intermediate transfer belt 25 can be stabilized.

Moreover, similar to the Second Embodiment, while the rotations of the photosensitive drum 4 are stabilized, the travel operation of the intermediate transfer belt 25 can be stabilized. It should be understood that in this case, any one of the drive roller 35 and the follow roller 36 may function as the roller 26 of FIG. 33.

Conversely, the rotary shaft 11 of FIG. 33 is coupled to either the roller 35 or the roller 36, the travel operation of the intermediate transfer belt 25 is stabilized by the rotary shaft 11, and the driven shaft 14 of the photosensitive drum 4 is coupled to the wheel rotary shaft 19, so that the travel operation of the photosensitive drum 4 may be stabilized. In this case, it is conceivable that the intermediate transfer belt 25 corresponds to the image carrier, and the photosensitive drum 4 corresponds to the preceding image carrier.

(Application Example 2)

Figure 35:
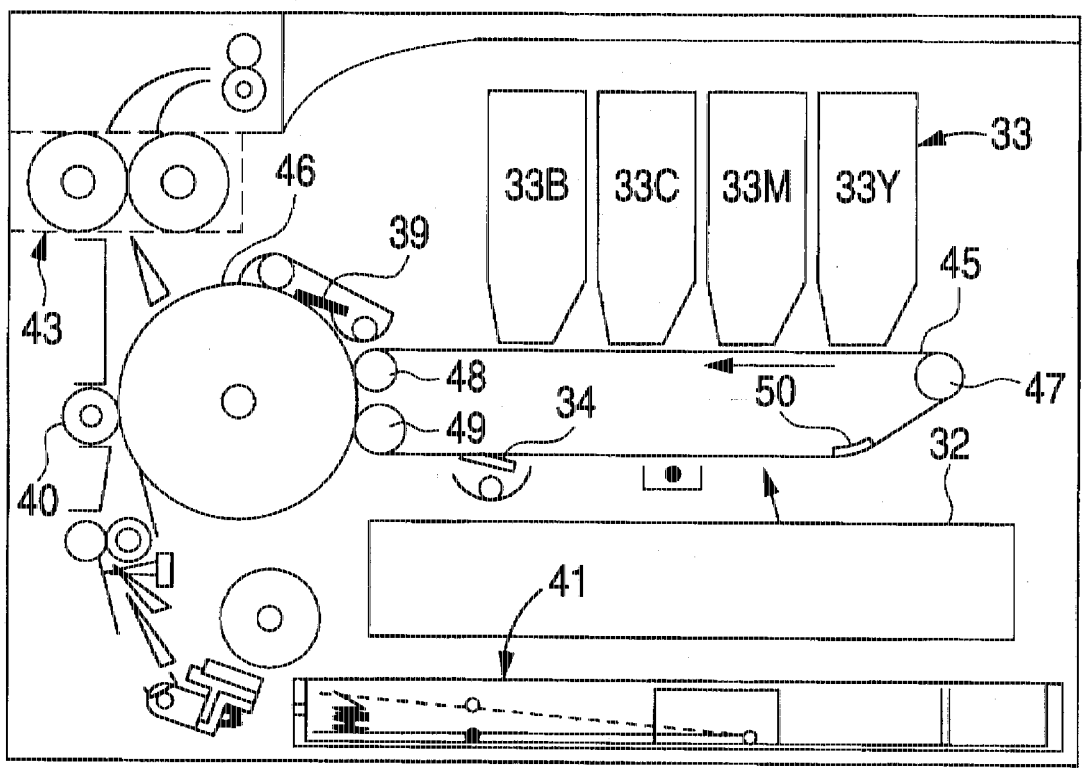
FIG. 35 is a side view for showing another application example according to the Embodiment.

FIG. 35 indicates another example of the image forming apparatus to which the embodiment can be applied. In this example, the photosensitive drum 4 of FIG. 34 is replaced by a photosensitive belt 45, and the intermediate transfer belt 25 is replaced by an intermediate transfer drum 46. Then, toner images are stacked on a surface of the photoconductive belt 45 from a fixed type developing unit 33, and this stacked toner image is once transferred onto an intermediate transfer drum 46, and further transferred onto a sheet.

The photosensitive belt 45 is supported by rollers 47, 48, 49 and a supporting plate 50, and is traveled around these members. The roller 47 corresponds to a drive roller, whereas the rollers 48 and 49 correspond to follow rollers. Around the photosensitive belt 44, there are.-arranged a charger 31 capable of charging the surfaces of this photosensitive drum 4, an exposing device 32 for exposing the charged surface to form a latent image, a developing unit 33 for supplying toner to the latent image so as to develop this latent image, and a cleaner 34 for cleaning toner and the like left on the photosensitive drum 4.

With the intermediate transfer drum 46, a transfer corotron (not shown) is arranged. The toner image is transferred from the photosensitive belt 45 to the intermediate transfer drum 46 by the effects of the electric fields generated from this corotron. Also, a bias transfer roller 40 is arranged in such a manner that this bias transfer roller 40 can be located in contact with the intermediate transfer roller 46, and a sheet is transported from a paper tray 41 between both rollers 40 and 46. The toner formed on the intermediate transfer drum 46 is transferred onto this sheet S by electric fields produced from the bias transfer roller 40. After the toner has been transferred, the sheet S is transported to a fixing device 43 so as to be heated/pressured. Thus, the toner is fixed on the sheet S, and further the sheet S is ejected to an ejection tray 44.

In this image forming apparatus, similar to the drive apparatus according to the First Embodiment, only the rotations of the intermediate transfer drum 46 can be firstly stabilized. Also, the shaft of the drive roller 47 is coupled to the rotary shaft 11, so that the traveling operation of only the photosensitive belt 45 can be stabilized.

Furthermore, in the drive apparatus of the Second Embodiment, the rotary shaft 11 is coupled to the shaft of the drive roller 47, and while the travel operation of the photosensitive belt 45 is stabilized, the wheel rotary shaft 19 is coupled with the shaft of the intermediate transfer drum 46, so that the rotation operation of the intermediate transfer drum 41 can be stabilized. Otherwise, conversely, the rotary shaft 11 of FIG. 33 is coupled to the shaft of the intermediate transfer drum 46, so that the rotation operation of the intermediate transfer drum 46 is stabilized. Furthermore, any one of the rollers 47, 48 and 49 is coupled to the wheel rotary shaft 19, so that the travel operation of the photosensitive belt 45 can be stabilized by the wheel rotary shaft 19. In this case, it is conceivable that the intermediate transfer drum 46 corresponds to the image carrier, and the photosensitive belt 45 corresponds to the preceding image carrier. It should be understood that in this case, any one of the drive roller 47 and the follow rollers 48 and 49 may function as the roller 26 of FIG. 2.

(Application Example 3)

Figure 36:
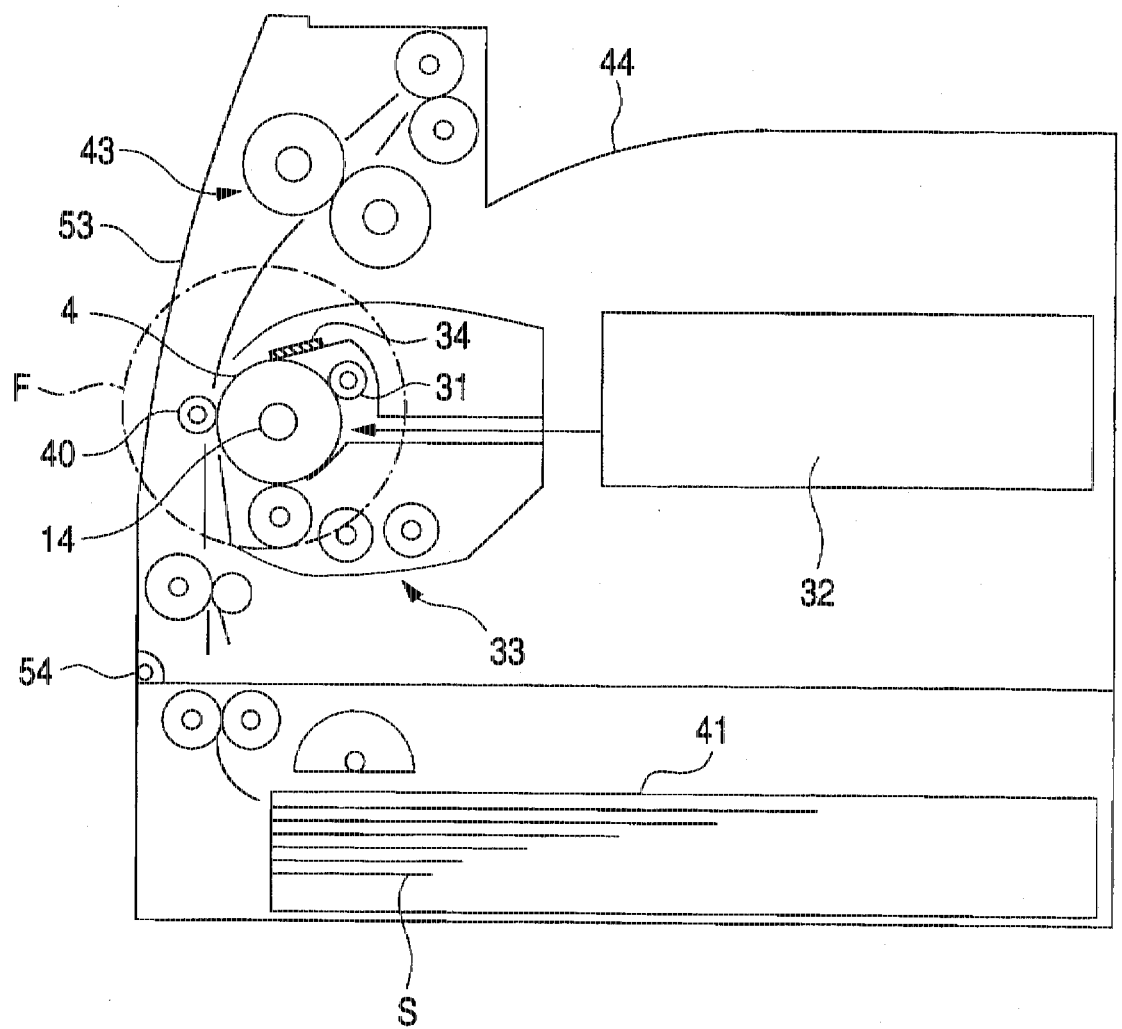
FIG. 36 is a side view for showing a further application example according to the Embodiment.

FIG. 36 indicates a further example of the image forming apparatus to which the embodiment can be applied. In this example, around the photosensitive drum 4, there are arranged a charging device 31 for charging a surface of the photosensitive drum 4, an exposure 32 for exposing the charged surface to form a latent image, a monochromatic developing unit 33 for supplying toner to the latent image so as to develop this latent image, a bias transfer roller 40, and a cleaner 34 for cleaning the toner and the like left on the photosensitive drum 4.

The photosensitive drum 4 is arranged in such a manner that this photosensitive drum 4 may be located in contact with the bias transfer roller 40, and the sheet S is transported from the paper tray 41 between these drum and roller. The toner on the photosensitive drum 4 is directly transferred onto this sheet S by the electric field produced by the bias transfer roller 40. Then, after the toner has been transferred, the sheet S is transported to the fixing device 43 to be heated/pressured, so that the toner is fixed on the sheet S. Furthermore, this sheet S is ejected to the ejection tray 44. As represented in this drawing, the transport path for the sheet S defined from the paper tray 41 to the ejection tray 44 is designed to transport the sheet S along the substantially vertical direction.

In this drawing, reference numeral 53 indicates a front cover of the image forming apparatus. This front cover 53 is rotatably (pivotally) mounted via a pivot shaft 54 to a cabinet of the image forming apparatus. Under normal condition, the front cover 53 is closed on the cabinet. When the sheet S is jammed, the front cover 53 is opened so as to eliminate the jammed sheet. As a consequence, the transport path for the sheet S is exposed when this front cover 53 is opened, and the photosensitive drum 4 for constituting a portion of the transport path is arranged near the front cover 53.

In such an arrangement, as indicated by a virtual line, when the flywheel F is directly mounted on the shaft 14 of the photosensitive drum 4, the front cover 53 could not be closed because of the large diameter of the flywheel F unless this front cover 53 owns a specific shape. However, according to the present invention, such a problem can be avoided by employing the structure such that the inertia energy of the flywheel 20 is transferred by the pulleys 19 and 21 to the photosensitive drum 4.

As previously described, in accordance with the present invention, it is possible to firmly stabilize the moving speed of the image carrier. Moreover, even when the friction coefficient is lowered due to wearing and contamination problems, the friction type wrapping transfer means can endure the long-term use. Also, this friction type wrapping transfer means does not greatly push up the cost. In addition, the image carrier can be readily replaced.

What is claimed is:

1. A drive apparatus for an image carrier of an image forming apparatus comprising:

a first rotary shaft rotated to thereby move an image carrier;

drive means for driving and rotating said first rotary shaft;

a flywheel rotated around a second rotary shaft as a center to thereby stabilize the rotations of said first rotary shaft;

a first pulley interlocked by said first rotary shaft;

a second pulley having a diameter smaller than, or equal to that of said first pulley and mounted on said second rotary shaft; and friction type wrapping transfer means wound on said first and second pulleys, wherein the drive force from said first rotary shaft to said second rotary shaft, and an angular velocity of said flywheel is set to be higher than, or equal to that of said first rotary shaft.

2. The drive apparatus for an image carrier of an image forming apparatus of claim 1, wherein the diameter of said second pulley is smaller than that of said first pulley; and the angular velocity of said flywheel is set higher than that of said first rotary shaft.

3. The drive apparatus for an image carrier of an image forming apparatus of claim 2, wherein said first and second pulleys are mainly made from resin;

a surface layer of said endless belt is made of rubber; and the diameter of said second pulley is larger than $1/8$ of the diameter of said first pulley.

4. The drive apparatus for an image carrier of an image forming apparatus of claim 3, wherein the diameter of said second pulley is larger than, or equal to $1/7$ of the diameter of said first pulley.

5. The drive apparatus for an image carrier of an image forming apparatus of claim 1, wherein said first rotary shaft is interlocked via a meshing type transfer mechanism by said drive means; and if a peripheral speed of said image carrier is selected to be P mm/s among a rotation frequency of said drive means, and a frequency of a vibration produced from the meshing operation of said meshing type transfer mechanism, a frequency of a vibration which is most close to at least P Hz is located within a frequency range where the vibration is attenuated by said drive apparatus.

6. The drive apparatus for an image carrier of an image forming apparatus of claim 5, wherein said drive apparatus is a vibration system having a free degree of substantially two, so that said drive apparatus essentially owns two natural frequencies;

there are frequency ranges near said natural frequencies where the respective vibrations are amplified;

there is one frequency range between said two frequency ranges where these vibrations are amplified, in which the vibrations are attenuated; and both the rotation frequency of said drive means and the frequency of the vibration produced by the meshing operation of said meshing type transfer mechanism are located in such a frequency range where this vibration is attenuated.

7. The drive apparatus for an image carrier of an image forming apparatus of claim 5, wherein said drive apparatus is a vibration system having a free degree of substantially 2, so that said drive apparatus essentially owns two natural frequencies;

there are frequency ranges near said natural frequencies where the respective vibrations are amplified; there is a first frequency range between said two frequency ranges where these vibrations are amplified, in which the vibration is attenuated;

there is a second frequency range where the vibrations are attenuated at a frequency higher than a frequency range where said higher vibration is amplified; and the rotation frequency of said drive means is located in said first frequency range where said vibration is attenuated, whereas the frequency of the vibration produced from the meshing operation of said meshing type transfer mechanism is located in said second frequency range where said vibration is attenuated.

8. The drive apparatus for an image carrier of an image forming apparatus of claim 1, wherein an intermediate transfer member is provided with said image forming apparatus, which is moved while being supported by the rotary shaft and to which an image formed on a surface of said image carrier is transferred; and a rotary shaft of said intermediate transfer member is interlocked to said second rotary shaft.

9. The drive apparatus for an image carrier of an image forming apparatus of any one of claim 1, wherein a preceding image carrier is provided with said image forming apparatus, which is moved while being supported by the rotary shaft, which has a surface on which an image has been formed, and which transfers the image to a surface of said image carrier; and a rotary shaft of said preceding image carrier is interlocked to said second rotary shaft.

10. An image forming apparatus comprising:

a first rotary shaft rotated to thereby move an image carrier;

drive means for driving and rotating said first rotary shaft;

a flywheel rotated around a second rotary shaft as a center to thereby stabilize the rotations of said first rotary shaft;

a first pulley interlocked by said first rotary shaft;

a second pulley having a diameter smaller than, or equal to that of said first pulley and mounted on said second rotary shaft; and friction type wrapping transfer means wound on these pulleys, wherein the drive force from said first rotary shaft to said second rotary shaft, and an angular velocity of said flywheel is set to be higher than, or equal to that of said first rotary shaft.

11. The image forming apparatus of claim 10, wherein the diameter of said second pulley is smaller than that of said first pulley; and the angular velocity of said flywheel is set higher than that of said first rotary shaft.

12. The image forming apparatus of claim 10, wherein said image forming apparatus comprises;

an intermediate transfer member which is moved while being supported by the rotary shaft, and to which an image formed on a surface of said image carrier is transferred; and a rotary shaft of said intermediate transfer member is interlocked to said second rotary shaft.

13. The image forming apparatus of claim 10, wherein said image forming apparatus comprise;

a preceding image carrier which is moved while being supported by the rotary shaft, which has a surface on which an image has been formed, and which transfers the image to a surface of said image carrier; and a rotary shaft of said preceding image carrier is interlocked to said second rotary shaft.

14. The image forming apparatus of claim 10, wherein said image forming apparatus comprises a cover; and sheet transport means for transporting a sheet along said cover in a vertical direction; and said image carrier is arranged near said cover in such a manner that an image is formed on the sheet transported by said sheet transporting means in a half way.

* * * * *